(12) United States Patent
Kato et al.

(10) Patent No.: US 6,795,499 B1
(45) Date of Patent: Sep. 21, 2004

(54) ENCODING APPARATUS AND METHOD, AND MULTIPLEXING APPARATUS AND METHOD

(75) Inventors: Motoki Kato, Kanagawa (JP); Koji Obata, Tokyo (JP); Nobuhiro Igi, Kanagawa (JP); Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 793 days.

(21) Appl. No.: 09/583,422

(22) Filed: May 31, 2000

(30) Foreign Application Priority Data

Jun. 1, 1999 (JP) ............................................. 11-154402
Mar. 27, 2000 (JP) ........................................ 2000-090769

(51) Int. Cl.[7] .............................. H04N 7/12; H04N 7/26
(52) U.S. Cl. ................ 375/240.01; 386/112; 348/419.1
(58) Field of Search ........................ 375/240.01, 240.02, 375/240.16, 240.28; 386/52, 91, 111–112; 382/236; 348/419.1, 423.1, 500; 341/55

(56) References Cited

U.S. PATENT DOCUMENTS

| | | | |
|---|---|---|---|
| 6,219,043 B1 * | 4/2001 | Yogeshwar et al. | 341/55 |
| 6,301,428 B1 * | 10/2001 | Linzer | 386/52 |
| 6,396,874 B1 * | 5/2002 | Kato | 375/240.16 |
| 6,483,945 B1 * | 11/2002 | Kato | 382/236 |
| 6,560,282 B2 * | 5/2003 | Tahara et al. | 375/240.02 |

FOREIGN PATENT DOCUMENTS

| | | | | |
|---|---|---|---|---|
| EP | 0 935 395 A | 8/1999 | ............ | H04N/7/24 |
| WO | WO 00 05864 A | 2/1999 | ............ | H04N/5/92 |

OTHER PUBLICATIONS

Wee S J et al: "Splicing MPEG Video Streams in the Compressed Domain" IEEE Workshop on Multimedia Signal Processing. Proceedings of Signal Processing Society Workshop on Multimedia Signal Processing, XX, XX Jun. 23, 1997, paged 225–230, XP000957700.

Hurst N et al: "MPEG Splicing: A New Standard for Television—SMPTE 312M" SMPTE Journal, SMPTE Inc. Scarsdale, N.Y, US, vol. 107, No. 11, Nov. 1998, pp. 978–988, XP000804761 ISSN: 0036–1682.

* cited by examiner

*Primary Examiner*—Gims Philippe
(74) *Attorney, Agent, or Firm*—Frommer Lawrence & Haug LLP; William S. Frommer; Darren M. Simon

(57) ABSTRACT

An encoder to encode video streams representing a moving picture is provided whose video encoder calculates a bit storage quantity an STD video buffer should have when input of a stream ending with a first picture to the STD video buffer ends, calculates an initial bit storage quantity of a second picture of a stream concatenated to the end of the first picture and starting with the second picture, in a VBV buffer, based on the calculated bit storage quantity of the STD buffer, and encodes the stream based on the bit storage quantity. The video encoder further calculates a bit storage quantity of the STD video buffer, for decoding a picture of the stream in the STD video buffer, calculates, based on the calculated bit storage quantity, a bit storage quantity the VBV buffer should have for ending decoding of a fourth picture of a second stream concatenated to the beginning of a third picture and ending with the fourth picture, and encodes the stream based on the calculated bit storage quantity. With such encoding, a part of video streams can be re-coded without referencing to information indicative of an initial status of a video buffer when editing the video streams.

6 Claims, 30 Drawing Sheets

FIG.4a  FIG.4b

ENCODING APPARATUS AND METHOD, AND MULTIPLEXING APPARATUS AND METHOD

BACKGROUND OF THE INVENTION

1. Field of the Invention

The present invention relates to a video stream encoder and video stream encoding method, and a video stream multiplexer and video stream multiplexing method, and more particularly, to a video stream encoder and video stream encoding method, and a video stream multiplexer and video stream multiplexing method, capable of re-encoding, for edition of a video stream, the video stream without reference to information indicative of an initial status of a video buffer when re-encoding a part of the video stream.

2. Description of the Related Art

There is available the MPEG (Moving Picture coding Experts Group) standard as one of the techniques for encoding video streams representing a moving picture. The MPEG standard prescribes a virtual decoder model for connection to the output of an encoder. More specifically, to prevent any underflowing and overflowing of a buffer in the decoder model, to which an encoded video stream is supplied, the MPEG standard limits the buffer capacity anticipated when encoding the video stream. By thus limiting the occupancy by stored data of the buffer included in the decoder model, the MPEG defines a limitation imposed on the encoding of a video stream. The virtual decoder model is called "VBV (Video Buffering Verifier)" and the buffer in the virtual decoder is called "VBV buffer".

For conformity with the requirements prescribed in the MPEG standard, a video stream should be encoded for neither underflowing nor overflowing of the VBV buffer. For example MP@ML (Main Profile at Main Level) of the MPEG-2 standard, the VBV buffer size is defined as 1.75 Mbits.

The encoder encodes a 16-bit field included in each picture and called "information indicative of an initial status of a video buffer" indicative of an initial status of the buffer at a random access. The information indicative of an initial status of a video buffer has a value representing a bit storage quantity (bit occupancy) the VBV buffer should have for decoding the picture. When decoding a picture, the virtual decoder reads a information indicative of an initial status of a video buffer appended to the picture, and then decodes the picture when the VBV buffer has a bit storage quantity represented by the information indicative of an initial status of a video buffer.

When editing two video streams encoded according to the MPEG standard to concatenate them with an accuracy of pictures, a few pictures before and after an edit point which is a concatenation between the two video streams are re-encoded in some cases. For a picture reproduction with a decoding of the edited video streams with no seam between them by the decoder, it is necessary that the video streams should have been edited and re-encoded for no overflowing and underflowing of the VBV buffer. To this end, an outpoint-side picture, in the edited video stream, positioned temporally before the edit point and an inpoint-side picture positioned temporally after the edit point are re-encoded as will be described below:

To re-encode an outpoint-side picture, the encoder first reads the information indicative of an initial status of a video buffer of a picture before a first picture to be re-encode. Next, the encoder uses the read information indicative of an initial status of a video buffer to calculate an initial bit storage quantity the VBV buffer should have for re-encoding the first picture to re-encoded by the VBV. Then, based on the computed initial bit storage quantity, the encoder re-encodes the pictures according to the VBV model.

Also, to re-encode an inpoint-side picture, the encoder first reads the information indicative of an initial status of a video buffer of a picture next to a last picture to re-encode. Next, the encoder uses the read information indicative of an initial status of a video buffer to calculate a bit storage quantity the VBV buffer should have for the last picture to re-encode by the VBV. Then, the encoder re-encodes the picture from the computed bit storage quantity according to the VBV model.

The MPEG-2 standard prescribes that it may optionally be selected whether or not information indicative of an initial status of a video buffer value should be encoded to be header information of a picture layer and included in a video stream. Therefore, in many cases, the above encoder encodes, into a value "0xFFFF", the 16-bit information indicative of an initial status of a video buffer field included in header information of a picture layer of a video stream having been encoded in conformity to the MPEG-2 standard. Thus, when the information indicative of an initial status of a video buffer value is optionally encoded, it is not possible to calculate a correct bit storage quantity of the VBV buffer for an arbitrary picture. Therefore, with the above encoder, a bit storage quantity cannot be computed and a picture cannot be re-encoded from any bit storage quantity when editing video streams.

OBJECT AND SUMMARY OF THE INVENTION

It is therefore an object of the present invention to overcome the above-mentioned drawbacks of the prior art by providing an encoding apparatus and method, and a multiplexing apparatus and method, adapted to re-encode a part of video streams in edition of them without the necessity of referencing to information indicative of an initial status of a video buffer included as a parameter of picture layer.

The above object can be attained by providing an encoder including, according to the present invention:

means for re-encoding a first encoded stream ending with a first picture and a second stream concatenated to the end of the first picture and starting with a second picture;

a first means for calculating, for a video buffer in a virtual system target decoder model for decoding encoded streams re-encoded by the encoding means, a first bit storage quantity which should be when input of the first picture of the first encoded stream to the video buffer ends;

a second means for calculating, based on the first bit storage quantity calculated by the first bit storage quantity calculating means, a second bit storage quantity the video buffer in the virtual system target decoder model should have for starting decoding of the second picture of the second encoded stream according to the virtual system target model; and means for controlling, based on the second bit storage quantity calculated by the second bit storage quantity calculating means, re-encoding of the second encoded stream, effected by the encoding means.

The above encoder further includes means for multiplexing, based on the first bit storage quantity, multiplexed streams including the second encoded stream re-encoded by the encoding controlling means.

The virtual system target decoder used in the above encoder conforms to the MPEG (Moving Picture coding Experts Group) standard.

Also the above object can be attained by providing an encoding method including, according to the present invention, steps of:

calculating, for a video buffer in a virtual system target decoder model for decoding re-encoded encoded streams, a first bit storage quantity which should be when input of a first picture of a first encoded stream ending with the first picture to the video buffer ends;

calculating, based on the first bit storage quantity, a second bit storage quantity the video buffer in the virtual system target decoder should have for starting, according to the virtual system target model, decoding of a second picture of a second encoded stream concatenated to the end of the first picture and beginning with the second picture; and re-encoding the second encoded stream based on the second bit storage quantity.

The above encoding method further includes a step of re-multiplexing, based on the first bit storage quantity, multiplexed streams including the second encoded stream re-encoded by the encoding controlling means.

The virtual system target decoder used in the above encoding method conforms to the MPEG (Moving Picture coding Experts Group) standard.

With the above encoding apparatus and method, it is possible to re-encode a part of video streams without the necessity of referencing to information indicative of an initial status of a video buffer included as a parameter of picture layer.

Also the above object can be attained by providing an encoder including according to the present invention:

means for re-encoding a first encoded stream beginning with a first picture and a second stream concatenated to the beginning of the first picture and ending with a second picture;

means for calculating a first bit storage quantity a video buffer in a virtual system target decoder model for decoding encoded streams re-encoded by the encoding means should have for decoding the first picture of the first encoded stream;

means for calculating, based on the first bit storage quantity calculated by the first bit storage quantity calculating means, a second bit storage quantity the video buffer in the virtual system target decoder model should have for ending decoding of the second picture of the second encoded stream according to the virtual system target model; and means for controlling, based on the second bit storage quantity calculated by the second bit storage quantity calculating means, re-encoding of the second encoded stream, effected by the encoding means The virtual system target decoder used in the above encoder conforms to the MPEG (Moving Picture coding Experts Group) standard.

Also the above object can be attained by providing an encoding method including, according to the present invention, steps of:

calculating a first bit storage quantity a video buffer in a virtual system target decoder model for decoding re-encoded encoded streams should have for decoding a first picture at the top of a first encoded stream;

calculating, based on the first bit storage quantity, a second bit storage quantity the video buffer should have for ending, according to the virtual system target model, decoding of a second picture of a second encoded stream concatenated to the beginning of the first picture and ending with the second picture; and re-encoding the second encoded stream based on the second bit storage quantity.

With the above encoding apparatus and method, it is possible to re-encode a part of video streams without the necessity of referencing to information indicative of an initial status of a video buffer included as a parameter of picture layer.

Also the above object can be attained by providing a multiplexer including according to the present invention:

means for re-encoding a first encoded stream beginning with a first picture and a second stream concatenated to the beginning of the first picture and ending with a second picture;

means for calculating a first bit storage quantity a video buffer in a virtual system target decoder model for decoding encoded streams re-encoded by the encoding means should have for decoding the first picture of the first encoded stream;

means for calculating, based on the first bit storage quantity calculated by the first bit storage quantity calculating means, a second bit storage quantity the video buffer in the virtual system target decoder model should have for decoding of the second picture of the second encoded stream according to the virtual system target model;

means for controlling, based on the second bit storage quantity calculated by the second bit storage quantity calculating means, re-encoding of the second encoded stream, effected by the encoding means;

a multiplexing means for generating a multiplexed stream including the second encoded stream using the second encoded stream re-encoded by the encoding means;

means for judging whether or not a third bit storage quantity the video buffer in the virtual system target decoder should have for concatenating the multiplexed stream re-multiplexed by the multiplexing means to a multiplexed stream including the first encoded stream presented after the re-multiplexed multiplexed stream from the multiplexing means, is within a predetermined range;

a multiplexing controlling means for controlling, based on the judgment result from the judging means, the time when the first picture of the multiplexed stream including the first encoded stream is to be supplied to the system target decoder model.

Also the above object can be attained by providing a multiplexing method including, according to the present invention, steps of:

calculating a first bit storage quantity a video buffer in a virtual system target decoder model for decoding re-encoded encoded streams should have for decoding a first picture at the top of a first encoded stream;

calculating, based on the first bit storage quantity, a second bit storage quantity the video buffer in the virtual system target decoder should have for ending, according to the virtual system target model, decoding of a second picture of a second encoded stream concatenated to the beginning of the first picture and ending with the second picture;

re-encoding the second encoded stream based on the second bit storage quantity;

generating a multiplexed stream including the second encoded stream using the re-encoded second encoded stream;

judging whether or not a third bit storage quantity the video buffer in the virtual system target decoder should have for concatenating the re-multiplexed multiplexed stream multiplexed to a multiplexed stream including the first encoded stream presented after the multiplexed stream, is within a predetermined range;

controlling, based on the judgment result, the time when the first picture of the multiplexed stream including the first encoded stream is to be supplied to the system target decoder model.

With the above multiplexing apparatus and method, it is possible to re-encode, for re-multiplexing, a part of video streams without the necessity of referencing to information indicative of an initial status of a video buffer included as a parameter of picture layer.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIGS. 23a to 23d show together another example of re-encoding of an outpoint-side video stream by the moving picture recording and/or reproducing apparatus, of which:

FIG. 23a shows an outpoint-side video stream including an outpoint picture;

FIG. 23b shows re-encoding and re-multiplexing of outpoint-side video streams by the moving picture recording and/or reproducing apparatus;

FIG. 23c shows another example of re-encoding and re-multiplexing of outpoint-side video streams by the moving picture recording and/or reproducing apparatus; and FIG. 23d shows a still another example of re-encoding and re-multiplexing of outpoint-side video streams by the moving picture recording and/or reproducing apparatus;

FIGS. 24a to 24d show together another example of re-encoding of an inpoint-side video stream by the moving picture recording and/or reproducing apparatus, of which:

FIG. 24a shows an inpoint-side video stream including an inpoint picture;

FIG. 24b shows re-encoding and re-multiplexing of inpoint-side video streams by the moving picture recording and/or reproducing apparatus;

FIG. 24c shows another example of re-encoding and re-multiplexing of inpoint-side video streams by the moving picture recording and/or reproducing apparatus; and FIG. 24d shows a still another example of re-encoding and re-multiplexing of inpoint-side video streams by the moving picture recording and/or reproducing apparatus;

DETAILED DESCRIPTION OF THE
PREFERRED EMBODIMENTS

Figure 1:
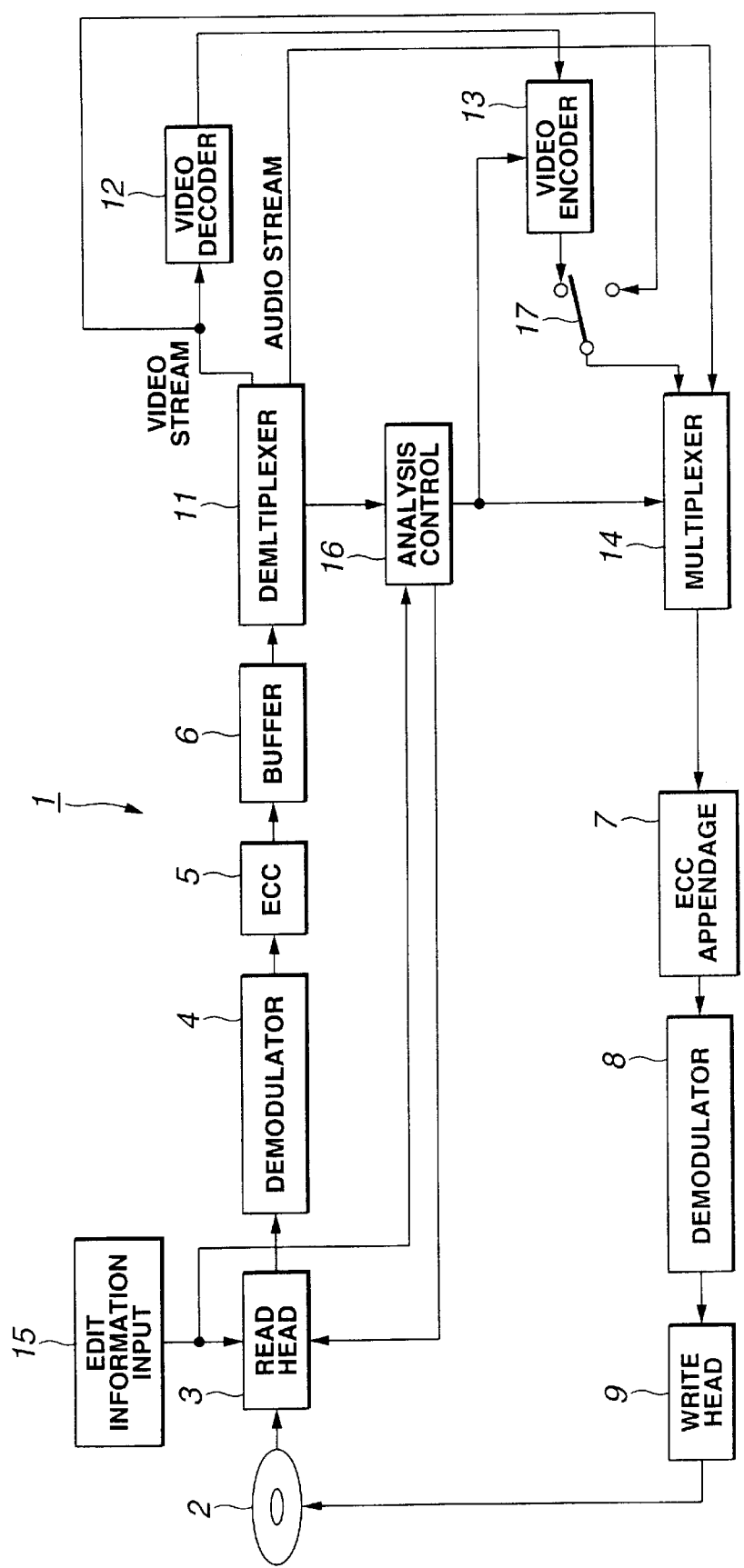
FIG. 1 is a block diagram of the moving picture recording and/or writing apparatus according to the present invention.

Referring now to FIG. 1, there is illustrated in the form of a schematic block diagram a moving picture recording and/or reproducing apparatus in which the encoder or encoding method and multiplexer or multiplexing method according to the present invention are employed. The moving picture recording and/or reproducing apparatus is generally indicated with a reference 1. The moving picture recording and/or reproducing apparatus 1 edits a moving image data having been compression-encoded according to the MPEG-2 standard to generate a moving image data which can be reproduced with no seam between two video streams concatenated by a decoder, and writes the moving picture data again to an optical disc 2.

The optical disc 2 used in the moving picture recording and/or reproducing apparatus 1 has packed therein a video data and audio data encoded according to the MPEG-2 standard, and has recorded therein multiplexed streams time-division multiplexed in units of a pack. A moving picture programing including an outpoint picture in any of two video streams concatenated for reproduction is called "outpoint-side program" and a moving picture program including an inpoint picture in the video stream is called "inpoint-side program". A group of pictures (GOP) including the outpoint picture in the video stream reproduced is called "outpoint-side GOP" and a GOP including the inpoint picture in the video stream reproduced is called "inpoint-side GOP".

As shown in FIG. 1, the moving picture recording and/or reproducing apparatus 1 includes a read head 3 to read multiplexed streams from the optical disc 2, a demodulator 4 to demodulate the multiplexed streams read by the read head 3, an error correction circuit (ECC) 5 to make an error correction of the multiplexed streams demodulated by the demodulator 4, a buffer 6 to provisionally store the multiplexed streams whose error has been corrected by the ECC circuit 5, an error correction code (ECC) appending circuit 7 to append an error correction code (ECC) to multiplexed streams generated by edition, a modulator 8 to modulate the multiplexed streams to which the ECC has been appended by the ECC appending circuit 7, and a write head 9 to write to the optical disc 2 the multiplexed streams modulated by the modulator 8.

Further, the moving picture recording and/or reproducing apparatus 1 includes a demultiplexer 11 to separate multiplexed streams stored in the buffer 6 into a video stream and audio stream, a video decoder 12 for decoding the video stream separated by the demultiplexer 11 to generate video data, a video encoder 13 for re-encoding the video data decoded by the video decoder 12 to generate video stream, and a multiplexer 14 for making a time-division multiplexing of the video and audio streams to generate multiplexed streams.

Moreover, the moving picture recording and/or reproducing apparatus 1 includes an edit information input device 15 to supply the read head 3 with edit information necessary for reproduction of information such as inpoint picture information and outpoint picture information. The edit information input device 15 generates edit information from inpoint picture information and outpoint picture information designated according to an operation input command supplied from a keyboard or the like operated by the user for example, and supplies it to the read head 3.

Also, the moving picture recording and/or reproducing apparatus 1 includes an analysis controller 16 which analyzes edit information supplied from the edit information input device 15, multiplexed streams supplied from the demultiplexer 11, etc., generates editing information necessary for allowing the decoder to make a seamless reproduction, and controls the video encoder 13 and multiplexer 14. The analysis controller 16 provides the video encoder 13 with a method allowing the video encoder 13 to re-encode the a video stream, and supplies the multiplexer 14 with editing information suggesting a method by which the multiplexer 14 is allowed to re-multiplex the video stream.

Furthermore, the moving picture recording and/or reproducing apparatus 1 includes a select switch 17 to select a video stream route along which a video stream is supplied to the multiplexer 14. Under the control of the analysis controller 16, the select switch 17 makes a selection between two routes, along which a video stream separated by the demultiplexer 11 is decoded by the video decoder 12 and re-encoded by the video encoder 13 and then supplied to the multiplexer 14, and the video stream separated by the demultiplexer 11 is supplied directly to the multiplexer 14, respectively. An audio stream separated by the demultiplexer 11 is supplied directly to the multiplexer 14 without being decoded and re-encoded.

In the moving picture recording and/or reproducing apparatus 1 constructed as in the above, the analysis controller 16 analyzes multiplexed streams recorded in the optical disc 2 to control the read head 3, video decoder 12, video encoder 13, multiplexer 14 and select switch 17, thereby producing a bridge sequence in which video streams concatenated by the decoder are reproduced with no seam between the video streams, and records the bridge sequence into the optical disc 2.

Re-encoding of a video stream in the moving picture recording and/or reproducing apparatus 1 will be described below:

In the moving picture recording and/or reproducing apparatus 1, a video stream is re-encoded by the video encoder 13 under the control of the analysis controller 16 so that for skip reproduction of a part of a moving picture program in the decoder, an outpoint-side program being a program temporally before an outpoint picture at which the skip reproduction is to start and an inpoint-side program being a program temporally after an inpoint picture at which the skip reproduction is to arrive, can be concatenated with no seam between them.

A GOP being a unit of picture groups conforming to the MPEG-2 standard includes three kinds of encoded pictures: at least an I (intra) picture being a reference picture resulted from encoding of a picture with no predictive encoding from any other picture, P (predictive) pictures being forward predictive-encoded picture resulted from encoding of a picture with a forward predictive encoding in the order of presentation, and B (bidirectional) pictures being bidirectional predictive-encoded pictures resulted from encoding of a picture within both forward predictive encoding and backward predictive encoding.

Figure 2:
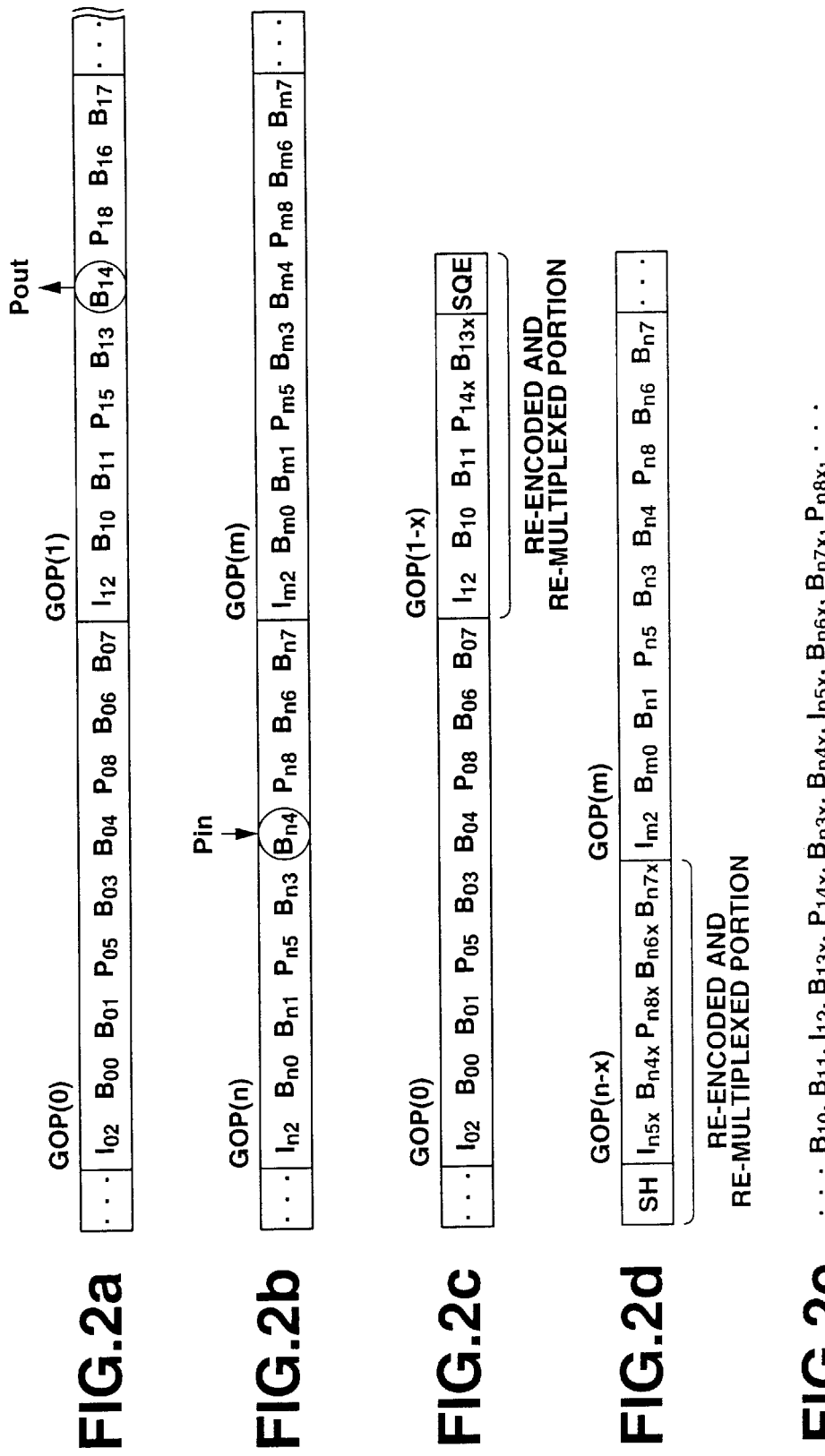
FIG. 2a shows a video stream at the outpoint side.
FIG. 2b shows a video stream at the inpoint side.
FIG. 2c shows a portion of the outpoint-side video streams, re-encoded and re-multiplexed by the moving picture recording and/or reproducing apparatus in FIG. 1.
FIG. 2d shows a portion of the inpoint-side video streams, re-encoded and re-multiplexed by the moving picture recording and/or reproducing apparatus.
FIG. 2e shows an order in which the video streams re-encoded and re-multiplexed by the moving picture recording and/or reproducing apparatus are presented.

Assume for example that as shown in FIG. 2a, an outpoint-side GOP including an outpoint picture (Pout) is GOP(1) and an outpoint picture is $B_{14}$ which is a B picture included in the outpoint-side GOP. The GOP(1) is contiguous to GOP(0). Also assume for example that as shown in FIG. 2b, an inpoint-side GOP including an inpoint picture (Pin) is GOP(n) and an outpoint picture is $B_{n4}$ which is a B picture included in the in point-side GOP. The GOP(n) is followed by GOP(m). Note that an I picture presented at the j-th position (namely, its temporal reference is "j") in the i-th GOP (namely, GOP(i)) will be annotated with "$I_{ij}$", a P picture presented at the i-th position in the i-th GOP(i) be annotated with "$P_{ij}$", and a B picture presented at the j-th position in the i-th GOP(i) be annotated with "$B_{ij}$".

More specifically, the GOP(1) being an outpoint-side GOP includes pictures $I_{12}$, $B_{10}$, $B_{11}$, $P_{15}$, $B_{13}$, $B_{14}$, $P_{18}$, $B_{16}$ and $B_{17}$ which are recorded in this order into the optical disc 2. Also, the GOP(n) being an inpoint-side GOP includes pictures $I_{n2}$, $B_{n0}$, $B_{n1}$, $P_{n5}$, $B_{n3}$, $B_{n4}$, $P_{n8}$, $B_{n6}$ and $B_{n7}$ which are recorded in this order into the optical disc 2.

The re-encoding by the video encoder 13 in the moving picture recording and/or reproducing apparatus 1 will be described below concerning the outpoint-side GOP and inpoint-side GOP as shown in FIGS. 2a and 2b.

First, The GOP(1) being an outpoint-side GOP including an outpoint picture (Pout) is decoded. Then, the GOP(1) is re-encoded so that the outpoint picture (Pout) can be decoded without the necessity of predictive reference to any encoded pictures after the outpoint picture (Pout) in the order of presentation. If the picture $B_{14}$ in the GOP(1) being an outpoint-side GOP as shown in FIG. 2a is an outpoint picture (Pout), the pictures $B_{13}$ and $B_{14}$ having been predictive-encoded based on the picture $P_{15}$ can be made without predictive reference to the picture $P_{15}$, thereby generating a GOP(1-x) being a new GOP as shown in FIG. 2c.

More particularly, to generate the GOP(1-x), first the pictures $I_{12}$, $B_{10}$, $B_{11}$, $P_{15}$, $B_{13}$ and $B_{14}$ are decoded and rendered back to non-coded video data by the video decoder 12, and then the picture $B_{14}$ is re-encoded to a picture $P_{14x}$ of a P picture predictive-encoded based on the picture $I_{12}$. Next, the picture $B_{13}$ is re-encoded to a picture $B_{13x}$ of a B picture predictive-encoded based on the pictures $I_{12}$ and $P_{14x}$. The pictures $I_{12}$, $B_{10}$ and $B_{12}$ are copied from the GOP(1) without being re-encoded. These pictures $I_{12}$, $B_{10}$ and $B_{12}$ may be re-encoded. As a result of the re-encoding, there is generated the GOP(1-x) composed of the pictures $I_{12}$, $B_{10}$, $B_{11}$, $P_{14x}$ and $B_{13x}$ and SQE (sequence-end-code) as shown in FIG. 2c.

Next, The GOP(n) being an inpoint-side GOP including an inpoint picture (Pin) is decoded. Then, the GOP(n) is re-encoded so that the outpoint picture (Pin) can be decoded without the necessity of predictive reference to any encoded pictures before the outpoint picture (Pin) in the order of presentation. If the picture $B_{n4}$ in the GOP(n) being an inpoint-side GOP as shown in FIG. 2b is an inpoint picture (Pin), the picture $B_{n4}$ having been predictive-encoded based on the picture $I_{n2}$ can be made without predictive referencing, thereby generating a GOP(n-x) being a new GOP as shown in FIG. 2d.

More particularly, to generate the GOP(n-X), first the pictures $I_{n2}$, $B_{n0}$, $B_{n1}$, $P_{n5}$, $B_{n3}$, $B_{n4}$, $P_{n8}$, $B_{n6}$ and $B_{n7}$ are decoded and rendered back to non-encoded video data by the video decoder 12, and then the picture $P_{n5}$ is re-encoded to a picture In5x of an I picture. For the pictures $B_{n4}$, $P_{n8}$, $B_{n6}$ and $B_{n7}$, pictures $B_{n4x}$, $P_{n8x}$, $B_{n6x}$ and $B_{n7x}$ of the same types as the pictures in consideration are re-encoded. As a result of the re-encoding, there is generated the GOP(n-x) composed of SH (sequence header) the pictures $I_{n5x}$, $B_{n4x}$, $P_{n8x}$, $B_{n6x}$ and $B_{n7x}$ as shown in FIG. 2e.

In the moving picture recording and/or reproducing apparatus 1, the re-encoding of the inpoint-side and outpoint-side GOPs is effected by the video decoder 12, video encoder 13 and select switch 17 under the control of the analysis controller 16. By re-encoding the pictures ( ..., $I_{12}$, $B_{10}$, $B_{11}$ and $B_{13}$) before the outpoint picture $B_{14}$ in the order of presentation and pictures ($P_{n5}$, $P_{n8}$, $B_{n6}$, $B_{n7}$, ... ) after the inpoint picture $B_{n4}$ in the order of presentation, the moving picture recording and/or reproducing apparatus 1 generates a moving picture which is displayed in a presented order of ..., $B_{10}$, $B_{11}$, $I_{12}$, $B_{13x}$, $P_{14x}$, $B_{n3x}$, $B_{n4x}$, $I_{n5x}$, $B_{n6x}$, $B_{n7x}$, $P_{n8x}$, ... , Next, the re-multiplexing of multiplexed streams by the multiplexer 14 provided in the moving picture recording and/or reproducing apparatus 1 will be described herebelow:

For skip reproduction of a part of a moving picture program in the decoder, the analysis controller 16 controls to have the multiplexer 14 re-multiplex multiplexed streams so that an outpoint-side program being a program temporally before an outpoint picture at which the skip reproduction is to start and an inpoint-side program being a program temporally after an inpoint picture at which the skip reproduction is to arrive can be concatenated with no seam between them.

Figure 3:
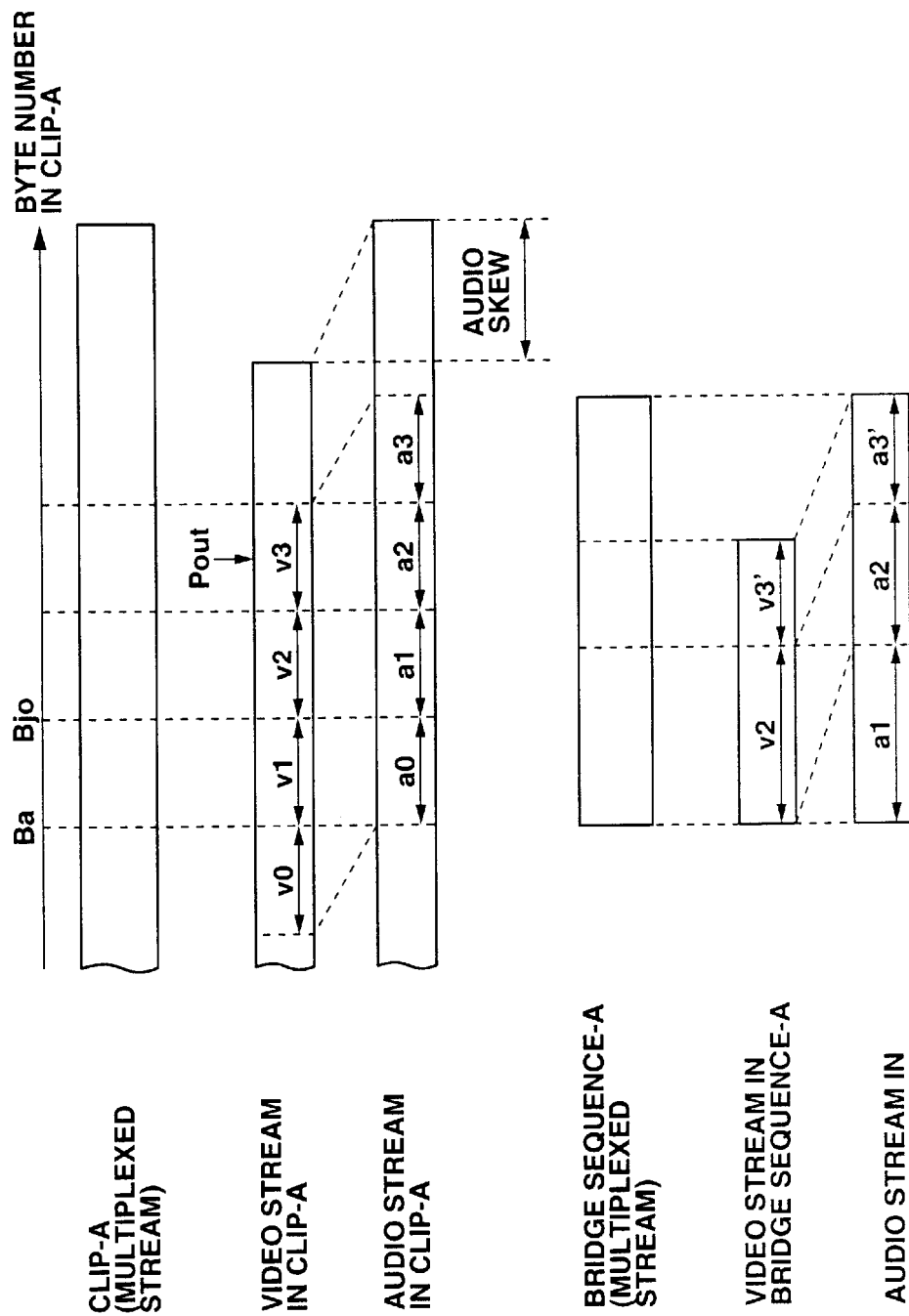
FIG. 3a shows multiplexed streams of an outpoint-side program re-multiplexed by the moving picture recording and/or reproducing apparatus.
FIG. 3b shows a bridge sequence generated by re-multiplexing.

FIG. 3a shows a structure example of multiplexed streams of an outpoint-side program. In FIG. 3a, Clip-A is multiplexed streams including the outpoint-side program. For example, it is a program stream followed by a system clock reference (SCR) defined in the MPEG-2 system standard (ISO/IEC 13818-1). The Clip-A includes video streams and audio streams as time-division multiplexed in packs. In FIG. 3, each of video streams v0, v1, v2 and v3 is a video stream having the length of a GOP, and each of audio streams a0, a1, a2 and a3 is an audio stream having the length of a GOP. In the Clip-A, the streams v1 and a0 are time-division multiplexed in packs between byte positions Ba and Bjo, for example, of the Clip-A. Note that one pack has a size of 2,048 bytes for example.

As shown in FIG. 3a, in the Clip-A, the audio streams are located at byte positions a-predetermined number of bytes (audio skew: AV multiplexing phase difference) off those of the video streams which will be reproduced synchronously with the audio streams. In the example shown in FIG. 3a, the audio skew is constant. It should be noted however that the audio skew may be variable in a program stream. In this example, the streams v0 and a0 are synchronous with each other. Similarly, the streams v1 and a1, v2 and a2, and v3 and a3 are synchronous with each other, respectively.

Assume here that an outpoint picture (Pout) is selected from a GOP of v3 in the Clip-A. In this case, the moving picture recording and/or reproducing apparatus 1 follows the procedure below to generate an outpoint-side bridge sequence in the following procedure. The bridge sequence is multiplexed streams acquired by re-multiplexing video streams generated by re-encoding video streams near the edit point.

First at the first step, the GOP of v3 including outpoint pictures is re-encoded by re-encoding the above video stream. In this case, a GOP of v3' is newly generated by re-encoding the GOP of video stream v3. The time length of this new video stream v3' is shorter than the video stream v3.

At the second step, one of video streams existing at byte points after a point Bjo for jump from the Clip-A to the outpoint-side bridge sequence and preceding the video stream v3, namely, video stream v2 in this case, is copied from the Clip-A. Also, audio streams at byte positions after the jump point Bjo and preceding an audio stream synchronous with the new video stream v3', that is, audio streams a1 and a2 in this case, are copied from the Clip-A. Next, the audio stream synchronous with the new video stream v3' is copied from inside the audio stream a3 to generate an audio stream a3'.

At the third step, the video streams and audio streams generated at the first and second steps are re-multiplexed. In this case, the video streams v2 and v3', and audio streams a1, a2 and a3' are re-multiplexed to generate a bridge sequence-A as shown in FIG. 3b and record it in the optical disc 2.

For reading the optical disc 2 having the bridge sequence-A recorded therein to concatenate the two video streams in the decoder for reproduction, the Clip-A is read down to the jump point Bjo for reproduction of the outpoint-side multiplexed streams, and then the bridge sequence-A is read.

Note that in the moving picture recording and/or reproducing apparatus 1, streams successively existing between the Clip-A down to the jump point Bjo and the bridge sequence-A have to be multiplexed to provide a programing stream followed by an SCR.

Figure 4:
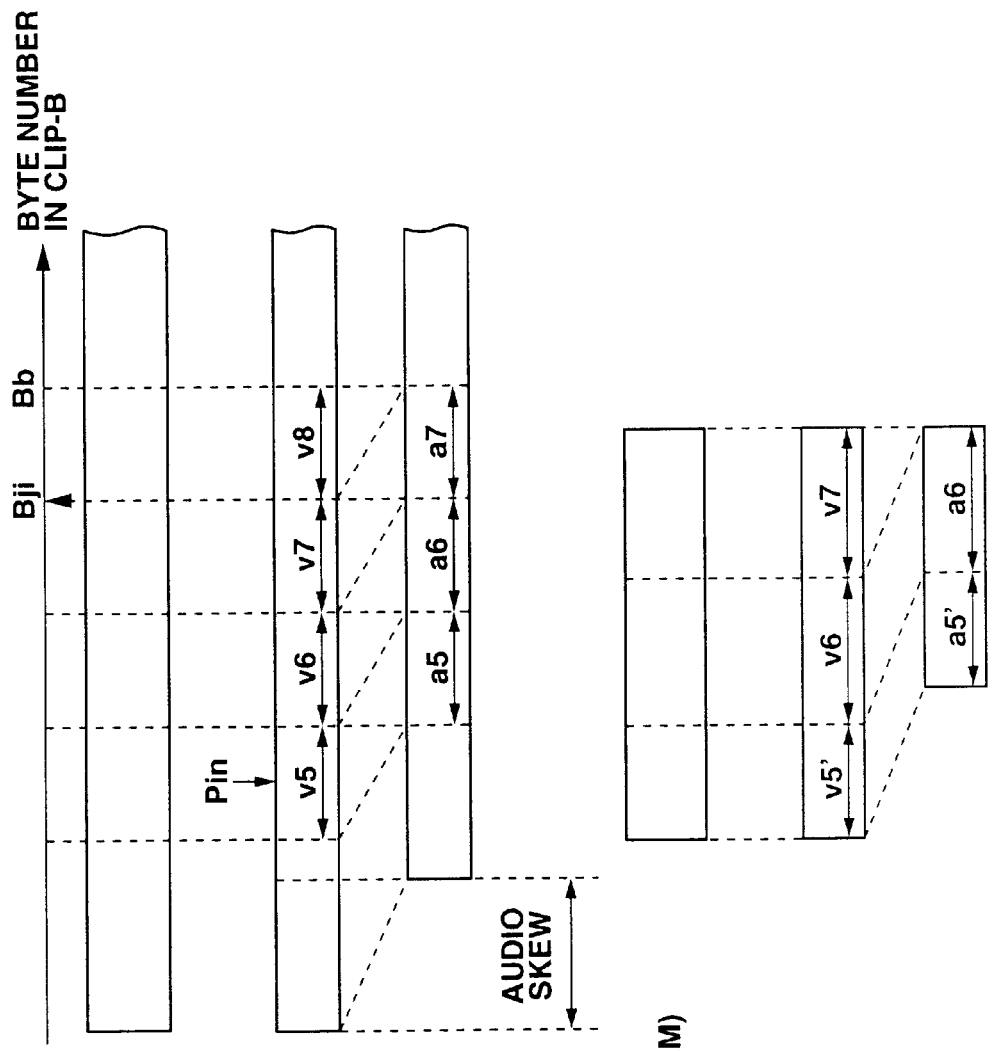
FIG. 4a shows multiplexed streams of the inpoint-side program re-multiplexed by the moving picture recording and/or reproducing apparatus.
FIG. 4b shows a bridge sequence generated by re-multiplexing.

FIG. 4a shows a structure example of multiplexed streams of an outpoint-side program. In FIG. 4a, Clip-B is multiplexed streams including the inpoint-side program. For example, it is a program stream followed by a system clock reference (SCR) defined in the MPEG-2 system. The Clip-B includes video streams and audio streams as time-division multiplexed in packs. In FIG. 4, each of video streams v5, v6, v7 and v8 is a video stream having the length of a GOP, and each of audio streams a5, a6 and a7 is an audio stream having the length of a GOP, as in FIG. 3. In the Clip-B, the streams v8 and a7 are time-division multiplexed in packs between byte positions Bji and Bb, for example, of the Clip-B. As shown in FIG. 4a, in the Clip-B, the audio streams are located at byte positions a predetermined number of bytes (audio) off those of the video streams which will be reproduced synchronously with the audio streams. Also in the example shown in FIG. 4a, the audio skew is constant. It should be noted however that the audio skew may be variable in a program stream. In this example, the streams v5 and a5 are synchronous with each other. Similarly, the streams v6 and a6, v7 and a7, and v8 and a8 are synchronous with each other, respectively.

Assume here that an inpoint picture (Pin) is selected from a GOP of v5 in the Clip-B. In this case, the moving picture recording and/or reproducing apparatus 1 follows the procedure below to generate an inpoint-side bridge sequence in the following procedure.

First at the first step, the GOP of v5 including inpoint pictures is re-encoded by re-encoding the above video stream. In this case, a GOP of v5' is newly generated by re-encoding the GOP of video stream v5. The time length of this new video stream v5' is shorter than the video stream v5.

At the second step, video streams existing after the video stream v5 and at byte points preceding a point Bji for jump from the inpoint-side bridge sequence to the Clip-B, namely, video streams v6 and v7 in this case, are copied from the Clip-B. Also, a one of audio streams existing after an audio stream synchronous with the new video stream v5' and at byte positions before the jump point Bji, that is, an audio stream a6 in this case, is copied from the Clip-B. Next, the audio stream synchronous with the new video stream v5' is copied from inside the audio stream a5 to generate an audio stream a5'.

At the third step, the video streams and audio streams generated at the first and second steps are re-multiplexed. In this case, the video streams v5', v6 and v7, and audio stream a5' and a6 are re-multiplexed to generate a bridge sequence-B as shown in FIG. 4b and record it in the optical disc 2.

For reading the optical disc 2 having the bridge sequence-B recorded therein to concatenate the two video streams in the decoder for reproduction, the bridge sequence-B is read for reproduction of the inpoint-side program, and then Clip-B is read from the jump point Bji.

Note that in the moving picture recording and/or reproducing apparatus 1, streams successively existing between the bridge sequence-B and Clip-B after the jump point Bji have to be multiplexed to provide a program stream followed by an SCR.

In the moving picture recording and/or reproducing apparatus 1, the above-mentioned re-multiplexing permits to generate the bridge sequence-A as shown in FIG. 3b and bridge sequence-B as shown in FIG. 4b.

Figure 5:
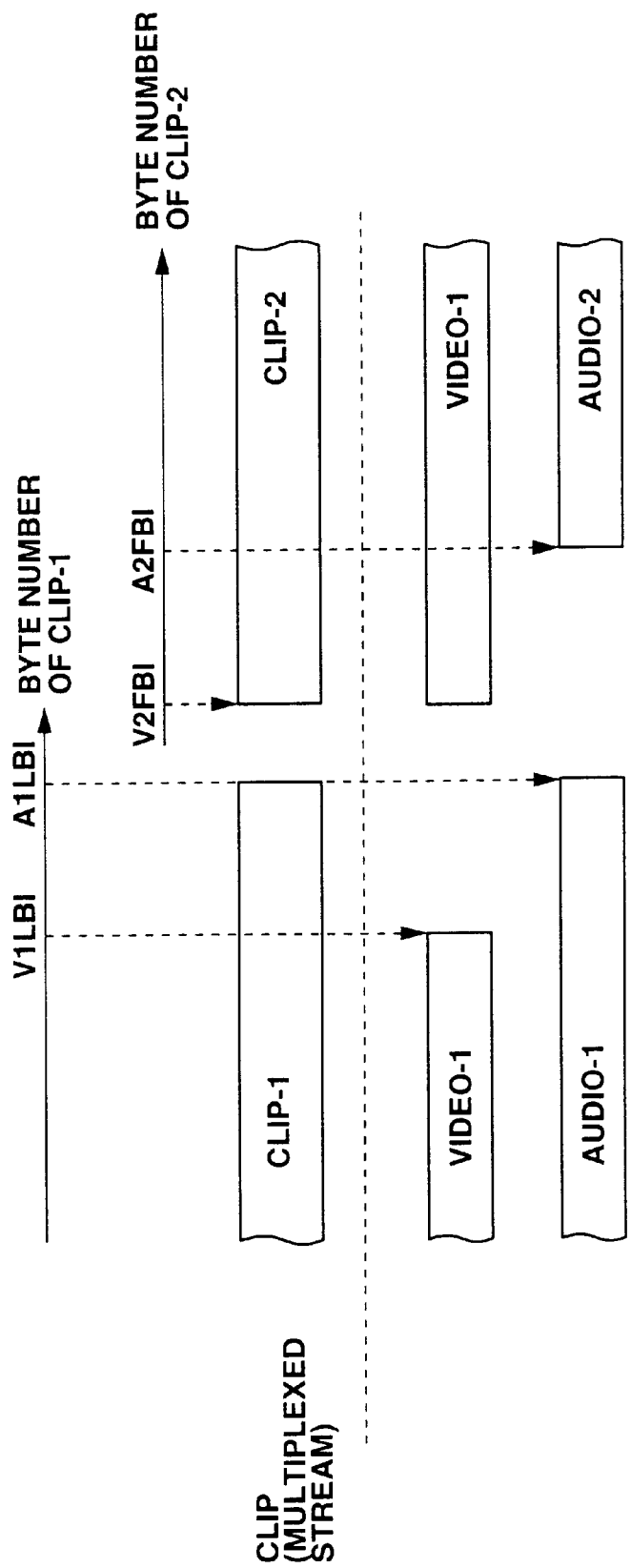
FIG. 5 shows structures of multiplexed streams, before and after an edit point, of the outpoint-side and inpoint-side programs, respectively.

FIG. 5 shows the structure of multiplexed streams presented before and after the edit point, in which it is assumed that multiplexed streams lasting from the Clip-A before the jump point Bjo to the bridge sequence-A are Clip-1 and a multiplexed stream lasting from the bridge sequence-B to the Clip-B after the jump point Bji are Clip-2. In the decoder, when the multiplexed stream lasting from Clip-1 to Clip-2 has successively been decoded, the video and audio streams have to be reproduced with no seam between them. In the moving picture recording and/or reproducing apparatus 1, for reproduction of the video and audio streams with no seam between them, the audio streams in Clip-1 and Clip-2 should be re-encoded and re-multiplexed with the following limits imparted to them:

In the moving picture recording and/or reproducing apparatus 1, the audio streams in Clip-1 and Clip-2 are limited so that no gap between times at which an audio stream is presented will exist at the boundary between the trailing end of Clip-1 and beginning end of Clip-2. More particularly, the audio streams of Clip-1 are re-multiplexed to include audio samples presented at a time when video streams of Clip-1 stops being presented, while the audio streams of Clip-2 are re-multiplexed to include audio samples presentation at a time when video streams of Clip-2 start being presented. Therefore, at the boundary between the trailing end of Clip-1 and beginning end of Clip-2, time lengths of presentation shorter than a time for less than two audio frames will possibly overlap each other. Note that in case of audio streams of Clip-1 in the MPEG-1 standard, one audio frame is an audio stream having a time length of presentation of 24 msec.

In FIG. 5, V1LBI, A1LBI, V2FBI and A2FBI in FIG. 5 are as follows:

V1LBI Last byte position of last pack in video-1 in Clip-1
A1LBI Last byte position of last pack in audio-1 in Clip-1
V2FBI First byte position of first pack in video-1 in Clip-2
A2FBI First byte position of first pack in audio-2 in Clip-2

These byte positions V1LBI and A1BLI, and V2FBI and A2FBI are in the following relations, respectively:

V1LBI<A1LBI
V2FBI<A2FBI

Other than the above relations are possible in the MPEG standard, but they rarely exist in practice.

Figure 6:
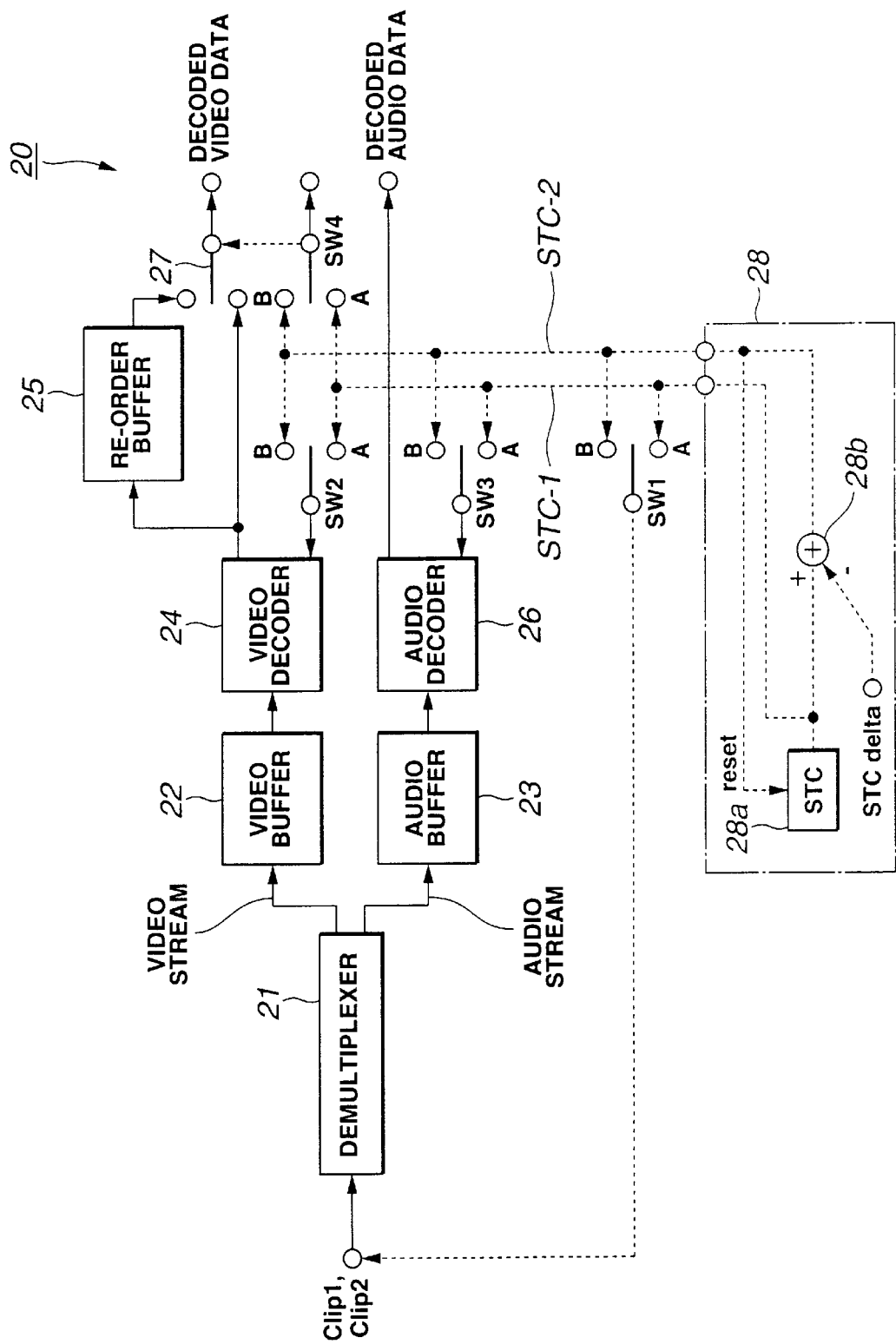
FIG. 6 is a block diagram of a system target decoder to decode streams multiplexed by the moving picture recording and/or reproducing apparatus.

FIG. 6 shows the construction of a system target decoder being a virtual decoder model intended to reproduce multiplexed streams Clip-1 and Clip-2 each including packs of audio streams and video streams re-encoded and re-multiplexed by the moving picture recording and/or reproducing apparatus 1 and recorded in the optical disc 2. The system target decoder is generally indicated with a reference 20.

Each of the multiplexed streams include a video pack having appended thereto as additional information SCR (system clock reference) indicative of a n output timing to the system target decoder 20, a decoding time stamp (DTS) indicative of a decoding timing and a presentation time stamp (PTS) indicative of an output timing of decoded data, and an audio pack having SCR, DTS and PTS appended thereto as additional information as in the video pack. The decoding timing and output timing are controlled with reference to these additional information.

As shown in FIG. 6, the system target decoder 20 includes a demultiplexer 21 to receive multiplexed streams Clip-1 and Clip-2 read from the optical disc 2 and separate the multiplexed streams into a video stream and audio stream, a video buffer 22 which provisionally stores the video stream separated by the demultiplexer 21, an audio buffer 23 which provisionally stores the audio stream separated by the demultiplexer 21, a video decoder 24 to extract, for decoding, the video stream stored in the video buffer 22, a re-order buffer 25 which provisionally stores decoded video data, an audio decoder 26 which extracts, for decoding, the audio stream stored in the audio buffer 23, and an output switch 27 which selects, for delivery as output, the video data decoded by the video decoder 24 or video data stored in the re-order buffer 25.

Further the system target decoder 20 includes a timing controller 28 to provide a system time clock (STC) used to control a timing of the selection between the video stream and audio stream by the demultiplexer 21, decoding timing of the video decoder 24, decoding and output timing of the audio decoder 26, and an output timing of the output switch 27.

Also the system target decoder 20 is provided with first to fourth STC switches SW1 to SW4 to make a selection between system time clocks STC-1 and STC-2 provided from the timing controller 28.

The demultiplexer 21 is supplied with packets forming together each multiplexed stream according to SCR appended to the multiplexed stream. Based on a STC supplied from the timing controller 28, the demultiplexer 21 separates the multiplexed stream into a video stream and audio stream. Ans, the demultiplexer 21 provides the video and audio streams to the video buffer 22 and audio buffer 23 at a predetermined output rate (program_mux_rate).

The video decoder 24 is provided to extract, for decoding, data of predetermined data from the video buffer 22 when DTS appended to the video stream coincides with STC supplied from the timing controller 28. Then, when PTS coincides with DTS, the video decoder 24 delivers the decoded data to outside via the output switch 27, or stores it once in the re-order buffer 25 and then delivers it to outside via the output switch 27.

The audio decoder 26 extracts, for decoding, the audio stream from the audio buffer 23 when DTS appended to the audio stream coincides with STC supplied from the timing controller 28. And the audio decoder 26 provides to the STC switch SW3 the audio data having been decoded when PTS and STC coincide with each other.

Note that the audio buffer 23 provided upstream of the audio decoder 26 should have a following size in view of the buffer size prescribed in the MPEG-2 CSPS=1:

additional-buffer-size=(program_mux-rate-Ra) * Ra/program-mux-rate where "Ra" is a maximum bit rate of the audio stream and "program-mux-rate" is either a maximum bit rate of the program stream Clip-1 or Clip-2 whichever is larger. For example, if program-mux-rate=10 Mbps and Ra=256 kbps, the additional-buffer-size of the audio buffer 23 is 0.249 Mbits.

The output switch 27 provides the decoded video data when PTS appended to the video pack coincides with STC supplied from the timing controller 28. Note that the output switch 27 provides as output the video data stored in the re-order buffer 25 as necessary.

When selecting, after the outpoint-side program, the inpoint-side program for concatenation of two video streams for reproduction, the timing controller 28 generates two STCs: one synchronous with SCR of the outpoint-side program and the other synchronous with SCR of the inpoint-side program.

The timing controller 28 includes an STC generator 28a to generate an STC and a subtractor 28b to subtract a predetermined offset value (STC_delta) from an STC generated by the STC generator 28a. Thus, the timing controller 28 generates two STCs. One of the STCs is an STC provided directly from the STC generator 28a and from which no offset value has been subtracted (this is synchronous with SCR of the outpoint-side program; will be referred to as "STC-1" hereinafter), and the other is a one derived from subtraction of the offset value (STC_delta) from an STC provided directly from the STC generator 28a (this is synchronous with SCR of the inpoint-side program; will be referred to as "STC-2" hereinafter).

The offset value (STC_delta) indicates an offset between the time bases of the multiplexed streams Clip-1 and Clip-2. Namely, the offset value is a difference between the time of Clip-1 on the time base when the video stream of Clip-1 disappears and the time of Clip-2 on the time base when the video stream of Clip-2 starts being presented.

On the assumption that PTS of an outpoint picture Pout on the time base of Clip-1 is PTS-Pout, presentation period of the outpoint picture Pout is Tpp and PTS of an inpoint picture Pin on the time base of Clip-2 is PTS-Pin, for example, the offset value "STC_delta" is given by the following expression (1):

$$PTS\text{-Pout-end}=PTS\text{-Pout}+Tpp$$

$$STC\text{-delta}=PTS\text{-Pout-end}-PTS\text{-Pin} \qquad (1)$$

Any of the two STCs (STC-1 and STC-2) provided from the timing controller 28 is selected by the first to forth STC switches SW1 to SW4, and supplied to the demultiplexer 21, video decoder 24, audio decoder 26 and output switch 27. The first STC switch SW1 will be supplied at a terminal A thereof with STC-1 and at a terminal B thereof with STC-2. It selects one of these terminals A and B and supplies STC supplied at the selected terminal to the demultiplexer 21. The second STC switch SW2 will be supplied at a terminal A thereof with STC-1 and at a terminal B thereof with STC-2. It selects one of these terminals A and B and supplies STC supplied at the selected terminal to the video decoder 24. The third STC switch SW3 will be supplied at a terminal A thereof with STC-1 and at a terminal B thereof with STC-2. It selects one of these terminals A and B and supplies STC supplied at the selected terminal to the audio decoder 26. The fourth STC switch SW4 will be supplied at a terminal A thereof with STC-1 and at a terminal B thereof with STC-2. It selects one of these terminals A and B and supplies STC supplied at the selected terminal to the output switch 27.

Figure 7:
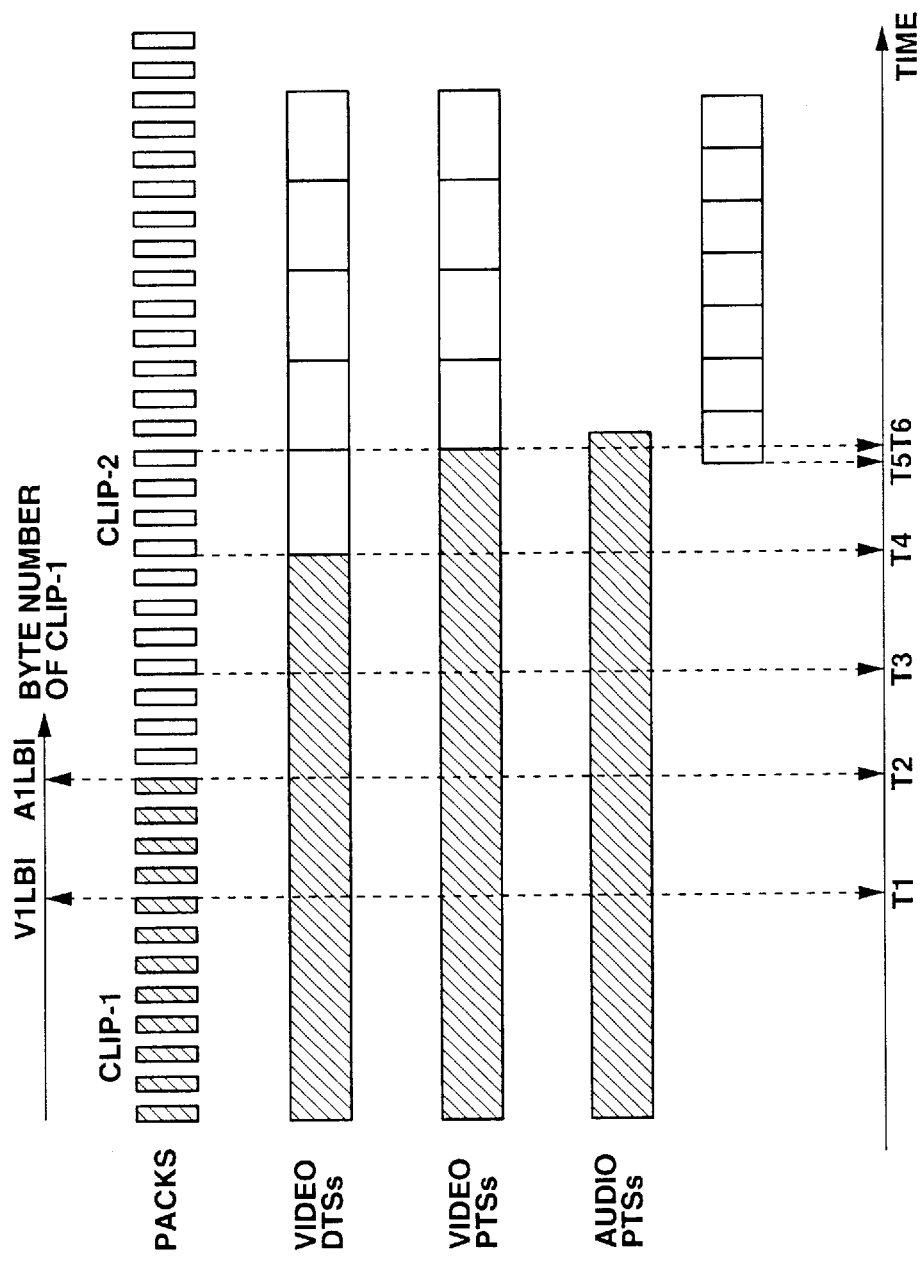
FIG. 7 is a timing chart of operations effected by the system target decoder when it is supplied with steams multiplexed by the moving picture recording and/or reproducing apparatus.

The system target decoder 20 constructed as in the above functions as will be described herebelow:

FIG. 7 is a timing chart of operations effected by the system target decoder 20 when it is supplied with two multiplexed steams Clip-1 and Clip-2 contiguous to each other.

First, SCR appended to the first pack in Clip-1 is set as STC in the STC generator 28a. All the first to fourth STC switches SW1 to SW4 are connected to the terminals A, respectively, and thus STC-1 (STC synchronous with SCR of Clip-1) is supplied to the demultiplexer 21, video decoder 24, audio decoder 26 and output switch 27. Namely, all the functions work based on SCR appended to Clip-1.

Before a time T1 is reached, input to the demultiplexer 21 is made at a time when SCR appended to each pack in Clip-1 coincides with STC-1 which has not yet added thereto an offset value supplied from the terminal A of the first STC switch SW1. Next, at the time T1, the entry of the last video pack of Clip-1 to the demultiplexer 21 ends. For a time from the time T1 to a time T2, the demultiplexer 21 is supplied with each pack of Clip-1 at a maximum bit rate "program_mux_rate1" of Clip-1 regardless of SCR appended to each pack. The maximum bit rate "program_mux_rate1" may be a maximum transfer rate at which data is to be read from the optical disc 2 for example.

On the assumption that a data amount from a pack next to the last video pack in Clip-1 to the last pack in Clip-1 is "N1", the time "ΔT1" from the time T1 to T2 is given by the following expression (2):

$$\Delta T1=T2-T1=N1/\text{program-mux-rate1} \qquad (2)$$

At the time T2, input of the last pack (audio pack) of Clip-1 to the demultiplexer 21 ends. At this time T2, the first STC switch SW1 is shifted to the terminal B and thus STC-2 (STC synchronous with SCR of Clip-2) is supplied to the demultiplexer 21. Therefore, the demultiplexer 21 starts functioning based on SCR appended to Clip-2.

For a time period between T2 and T3, the demultiplexer 21 is supplied with packs including from the first pack in Clip-2 to a pack before the first video pack in Clip-2 at the maximum bit rate program_mux_rate2 of Clip-2 regardless of SCR of each pack when the first packet in Clip-2 is not a video pack. The maximum bit rate program_mux_rate2 may be a maximum transfer rate for reading data from the optical disc 2, for example.

Assuming that the data amount from the first pack in Clip-2 to a pack before the first video pack in Clip-2 is "N2", the time "ΔT2" from the time T2 to a time T3 is given by the following expression (3):

$$\Delta T2=T3-T2=N2/\text{program-mux-rate2} \qquad (3)$$

Note that since the first pack in an MPEG-2 program stream is usually a video pack, ΔT2=0.

Further at the time T3, the entry of the first video pack in Clip-2 to the demultiplexer 21 starts. Subsequently, input to the demultiplexer 21 is made at a time when SCR of each pack in Clip-2 coincides with STC-1 which has added thereto an offset value supplied from the terminal B of the first STC switch SW1. At this time, SCR of the first video pack in Clip-2 should meet the requirement given by the following expression (4):

$$SCR\text{-video2-start}>SCR\text{-video1-end}-STC\text{-delta}+\Delta T1+\Delta T2 \qquad (4)$$

SCR-video1-end=SCR-last-video1+pack_length/program_mux_rate1 where SCR-video2-start is SCR of the first video pack in Clip-2, SCR-video1-end is a time on the time base of Clip-1 when input the last video pack in Clip-1 to the demultiplexer 21 ends. This value can be calculated as follows from system-clock-reference(SCR-last-video1), program-mux-rate 1 and pack-length of the last video pack in Clip-1. The pack-length is 2,048 bytes for example.

Next at a time T4, the second STC switch SW2 is shifted from the terminal A thereof to the terminal B, and STC to which the video decoder 24 makes reference is changed from STC-1 to STC-2. Since STC is changed for reference to DTS appended to each picture in the video stream, the video decoder 24 starts decoding the video stream in Clip-2.

At a time T5, the third STC switch SW3 is shifted from the terminal A thereof to the terminal B, and STC to which the audio decoder 26 make reference is changed from STC-1 to STC-2. Since STC is changed for reference to PTS appended to each picture in the audio stream, the audio decoder 26 starts output of audio streams in Clip-2. Note that when the audio data at the trailing end of Clip-1 and audio data at the beginning end of Clip-2 overlap each other, it is necessary to select which sample of these audio data should be presented.

Next at a time T6, the fourth STC switch SW4 is shifted from the terminal A thereof to the terminal B, and STC to which the output switch 27 makes reference is changed from STC-1 to STC-2. Since STC is changed for reference to PTS appended to each picture in the video stream, the output switch 27 starts output of the video stream in Clip-2.

If all the first to fourth STC switches SW1 to SW4 are shifted to their respective terminals B, respectively, at this time T6, the value of STC generated by the STC generator 28a is reset to [STC-STC-delta] and at the same time all the first to fourth STC switches SW1 to SW4 are shifted to their respective terminals A. Thus, the status before the time T1 is restored.

The system target decoder 20 defining the above-mentioned virtual decoder model, defines, by the moving picture recording and/or reproducing apparatus 1, the limitation imposed on the encoding and multiplexing of video streams to limit the capacity of the video buffer 22 in order to prevent underflowing and overflowing of the video buffer 22 when encoded video stream is supplied to the video decoder 22.

Figure 8:
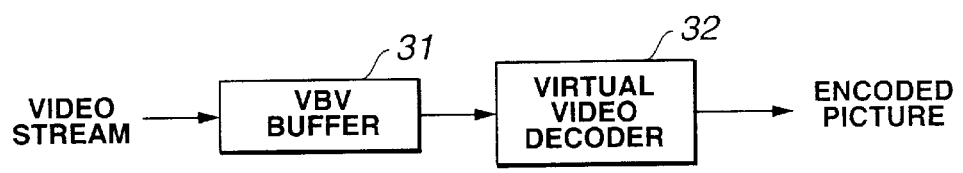
FIG. 8 shows a VBV model conforming to the MPEG standard.

For encoding and multiplexing video streams by the moving picture recording and/or reproducing apparatus 1, the video streams are encoded to comply with the VBV (video buffering verifier) model 30 conforming to the MPEG standard, shown in FIG. 8, and then multiplexed to prevent overflowing of the video buffer 22 of the system target decoder in FIG. 6.

The VBV model 30 includes a VBV buffer 31 which is supplied with video streams and a virtual video decoder 32 which is supplied with the video streams at a predetermined output timing from the VBV buffer 31 to decode the video streams. Namely, the VBV model 30 is designed to make an ideal decoding and provide decoded pictures.

The moving picture recording and/or reproducing apparatus 1 encodes a 16-bit field "information indicative of an initial status of a video buffer" included in each picture and indicative of the initial status of the VBV buffer 31 at the time of random access. The information indicative of an initial status of a video buffer value represents a bit storage quantity the VBV buffer 31 should have for decoding the picture. When decoding a picture, the virtual video decoder 32 of the VBV model 30 reads information indicative of an initial status of a video buffer appended to that picture, and decodes the picture when the bit storage quantity of the VBV buffer 31 has reached the bit storage quantity represented by information indicative of an initial status of a video buffer.

Figure 9:
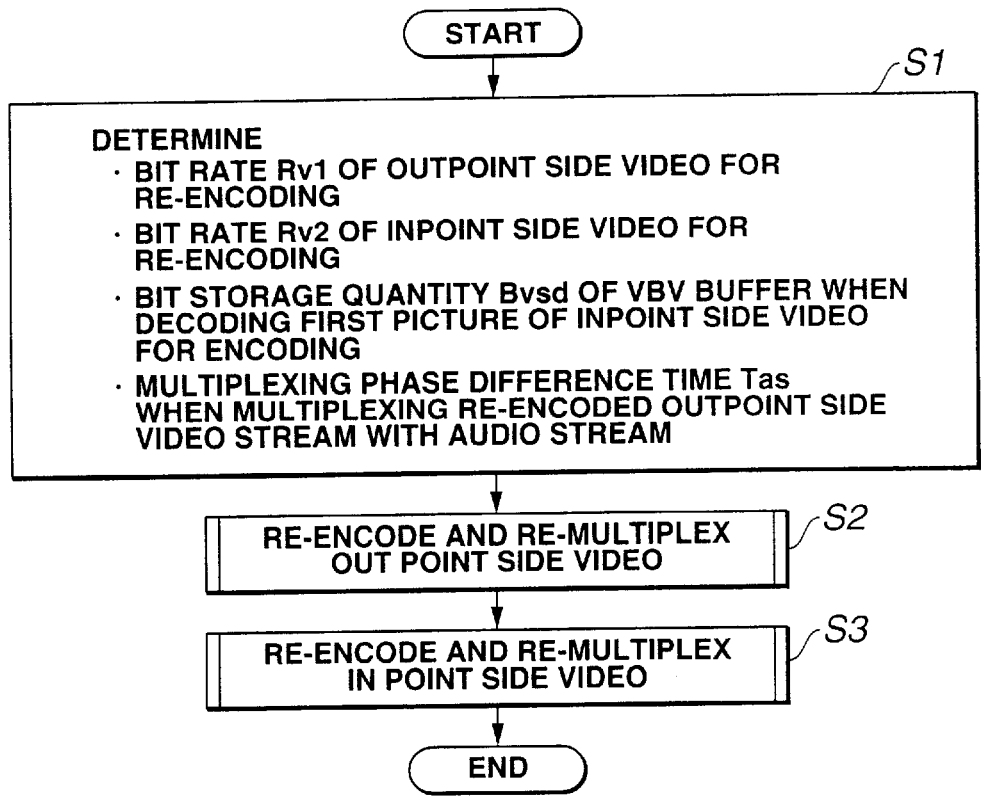
FIG. 9 is a flow chart of operations effected by the moving picture recording and/or reproducing apparatus for re-encoding video streams and then re-multiplexing them.

FIG. 9 is a flow chart of operations effected by the moving picture recording and/or reproducing apparatus 1 for re-encoding video streams and then re-multiplexing them according to the limitations on the definition of a virtual decoder model such as the aforementioned system target decoder 20 to re-encode and re-multiplex the video streams. The re-encoding and re-multiplexing will be described below:

As shown in FIG. 9, at step S1, the moving picture recording and/or reproducing apparatus 1 determines various parameters for coping with the limitations defined by the system target decoder 20 in re-encoding by the video encoder 13 and re-multiplexing by the multiplexer 14.

More particularly, the moving picture recording and/or reproducing apparatus 1 determines a bit rate "Rv1" of video streams in an outpoint-side program to re-encode, bit rate "Rv2" of video streams in an inpoint-side program to re-encode, bit storage quantity Bvsd the VBV buffer 31 should have for decoding the first picture in the inpoint-side program to re-encode, and a multiplexing phase difference time Tas for multiplexing video streams and audio streams in the re-encoded outpoint-side program. The variety of parameters are set as will further be described later.

Next at step S2, the moving picture recording and/or reproducing apparatus 1 re-encodes video streams in the outpoint-side program by means of the video encoder 13, and makes time-division multiplexing of the re-encoded video streams and audio streams in packs by means of the multiplexer 14. The outpoint-side program is re-encoded and re-multiplexed as will further be described later.

At step S3, the moving picture recording and/or reproducing apparatus 1 ends its operations by re-encoding video streams in the inpoint-side program by means of the video encoder 13, and making time-division multiplexing of the re-encoded video streams and audio streams in packs by means of the multiplexer 14. The inpoint-side program is re-encoded and re-multiplexed as will further be described later.

Next, the variety of parameters used for re-encoding at step S1 shown in FIG. 9 will be described herebelow:

In the moving picture recording and/or reproducing apparatus 1, when data are re-encoded by the video encoder 13 and when a video stream in the multiplexed streams including Clip-1 and Clip-2 are edited, the bit rate "Rv1", bit rate "Rv2", bit storage quantity Bvsd and multiplexing phase difference time Tas are determined to meet the following expression (5):

$$(Tvs1-Tms1)+(Tvs2-Tms2)<\Delta T1 \tag{5}$$

where $Tvs1=Bvsd/Rv1$, $Tms1=Bvsd/(R1-Ra1)$, $Tvs2=Bvsd/Rv2$, $Tms2=Bvsd/(Rm2-Ra2)$ and $\Delta T1=Tas*Ra1/Rm1$.

Rm1 is a bit rate "program_mux-rate" of the multiplexed stream of Clip-1, Ra1 is a bit rate of the audio stream in Clip-1. Rm2 is a bit rate "program-mux-rate", Ra2 is a bit rate of audio stream in Clip-2. Rm1 and Rm2 are given by the following expressions (6) and (7), respectively:

$$Rm1=Ra1+Rv1+\alpha \tag{6}$$

$$Rm2=Ra2+Rv2+\beta \tag{7}$$

where $\alpha>0$ and $\beta>0$.

Further, Bvsd is a bit storage quantity of the VBV buffer 31. It is a bit storage quantity the VBV buffer 31 should have for decoding the first 1 picture in GOP included in an inpoint picture of Clip-2 for example.

Figure 10:
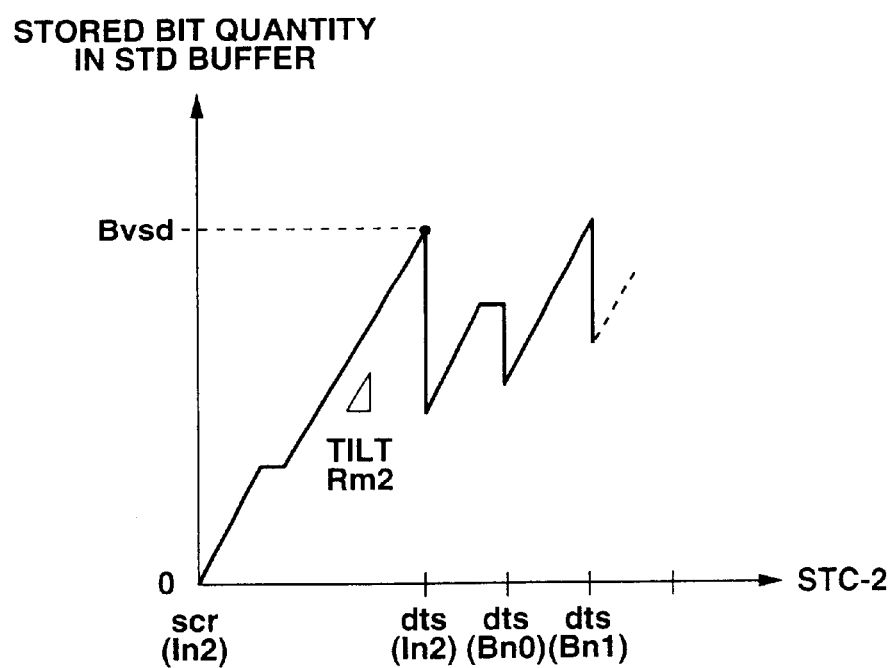
FIG. 10 shows a relation between STC time for Clip-2 and bit storage quantity the video buffer (bit storage quantity for STD buffer) should have.
Figure 15:
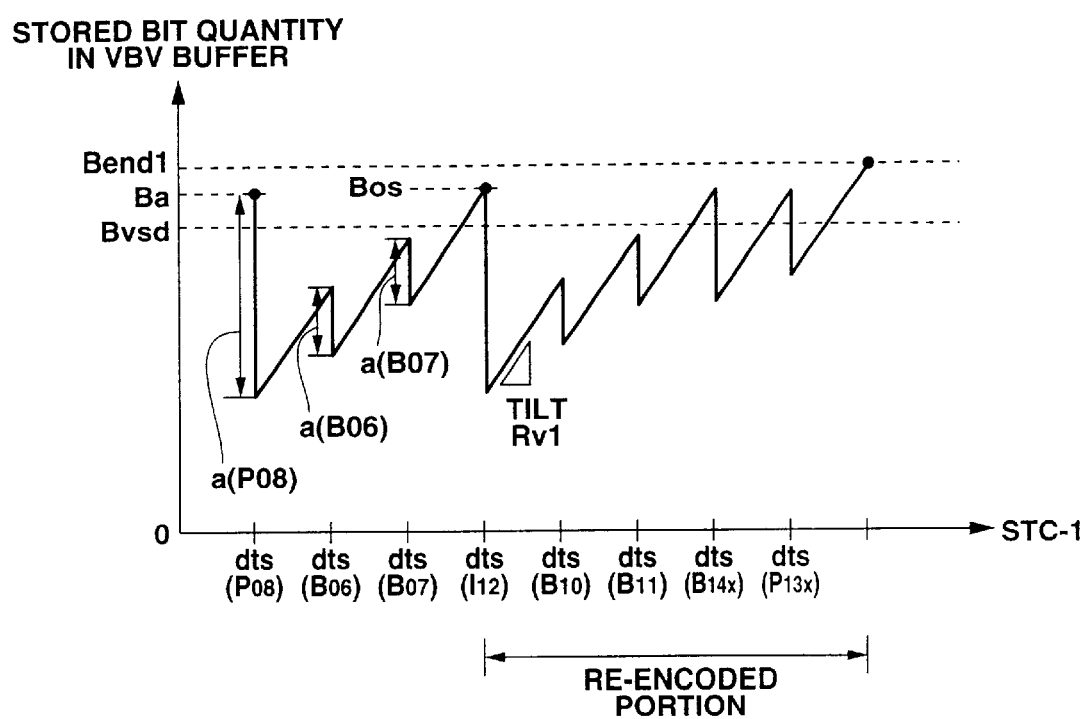
FIG. 15 shows a relation between quantity of bits stored in the VBV video buffer when the inpoint-side video stream ($I_{12}$, . . . ) is supplied, and STC-1 according to SCR added to a video pack.

An example that Bvsd is a bit storage quantity of the VBV buffer 31 for decoding the picture $I_{n2}$ in GOP(n) shown in FIG. 2b will be described herebelow with reference to FIG. 10 showing a relation between STC time (STC-2) for Clip-2 and bit storage quantity of the video buffer 22 (bit storage quantity for STD buffer) for supplying the system target decoder 20 with video and audio streams. In FIG. 10, the STD buffer indicates a bit storage quantity of the video buffer 22 for supplying the system target decoder 20 with Clip-1 and Clip-2 of multiplexed video stream and audio streams. Therefore, since the time zone in which the bit storage quantity is indicated with a line whose gradient is zero (horizontal) is a one for which audio streams are supplied from the demultiplexer 21 for example to the audio buffer 23, the bit storage quantity of the STD buffer indicates that the data input to the video buffer 22 is stopping. FIG. 15 shows a bit storage quantity of the VBV buffer 31 for supplying only video streams to the VBV buffer 31. In FIG. 10, the gradient of the rightward ascending line indicates a bit rate of the multiplexed streams. In FIG. 15, the rightward ascending line indicates a bit rate of video streams.

In FIG. 10, $scr(I_{n2})$ is a time at which a video pack including a top video pack of picture $I_{n2}$ is supplied to the system target decoder 20, and also a time presented at SCR included in the header of the video pack. The pack including a top data of the picture $I_{n2}$ is supplied to the system target decoder 20 at a time when STC and scr($I_{n2}$) coincide with each other. When the system target decoder 20 is supplied with the video stream of the video pack, the bit storage quantity of the video buffer 22 increases at a bit rate "Rm2". In FIG. 10, dts($I_{n2}$) is a time when the picture $I_{n2}$ is decoded, and also a time indicated with DTS appended to a video pack including the picture $I_{n2}$. At the time dts($I_{n2}$), the video data of the picture $I_{n2}$ is drawn and the bit storage quantity decreases.

As shown in FIG. 10, the bit storage quantity of the video buffer 22 in the system target decoder 20 at the time dts($I_{n2}$) is a bit storage quantity Bvsd in the VBV buffer 31 for decoding the first picture of the inpoint-side video stream to re-encode.

Furthermore, ΔT1 is a time from a time (T1) when input of the last video pack of Clip-1 to the demultiplexer 21 ends until a time (T2) when input of the last pack (audio pack) of Clip-1 to the demultiplexer 21 ends, and it is given by the following expression (8):

$$\Delta T1 = T2 - T1 = N1/\text{program\_mux-rate} \quad (8)$$

where N1 is a data amount counted from a pack next to the last video pack of Clip-1 to the last pack of Clip-1.

The moving picture recoding and/or reproducing apparatus 1 re-encodes and re-multiplexes so that the bit rates "Rv1" and "Rv2", bit storage quantity "Bvsd" and multiplexing phase difference time Tas defined as in the above will meet the requirements defined by the aforementioned expression (4).

Figure 11:
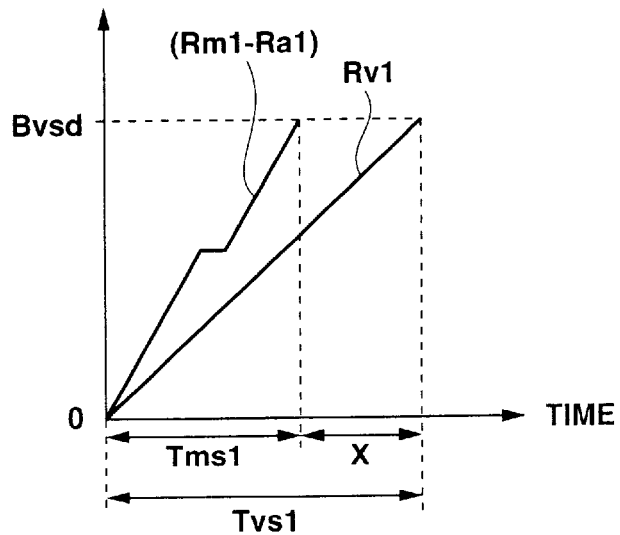
FIG. 11 shows a relation between time and bit storage quantity the video buffer (bit storage quantity for STD buffer) should have for encoding Clip-1.

FIG. 11 shows a relation between time and quantity of bits stored in the VBV buffer 31 or STD buffer (video buffer 22) when encoding Clip-1. As shown in FIG. 11, Tms1 is a time taken of the bit storage quantity Bvsd to be reached when the video buffer 22 is supplied with video streams at a bit rate Rm1-Ra1, and Tvs1 is a time required of the bit storage quantity Bvsd to be reached when the VBV buffer 31 is supplied with video streams at a bit rate Rv1. When video streams of Clip-1 are supplied to the video buffer 22, the larger the term α in the expression (6), the longer the time X (=Tvs1-Tms1) in FIG. 11 is, so that the time (SCR-video1-end) at which input of video data in Clip-1 to the video buffer 22 ends can be reached more early.

Figure 12:
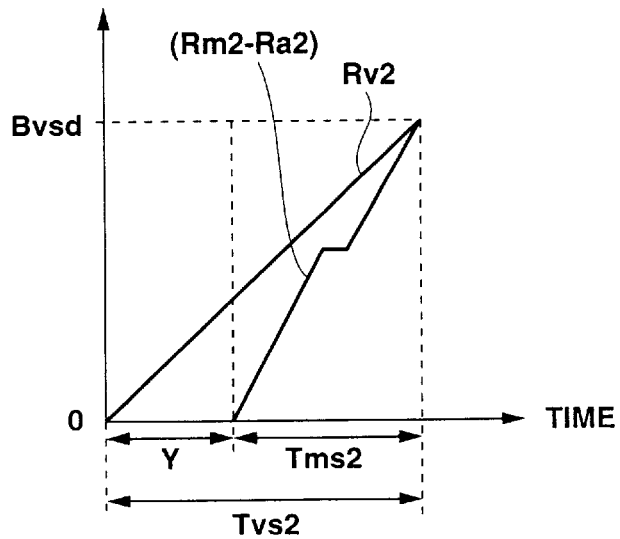
FIG. 12 shows a relation between tune and bit storage quantity the video buffer (bit storage quantity for STD buffer) should have for encoding Clip-2.

Further, FIG. 12 shows a relation between time and quantity of bits stored in the VBV buffer 31 or STD buffer (video buffer 22) when encoding Clip-2. In FIG. 12, Tms2 is a time required for the bit storage quantity to be reached when video streams are supplied to the video buffer 22 at the bit rate "Rm2-Ra2", and Tbs2 is a time required for the bit storage quantity Bvsd to be reached when video streams are supplied to the VBV buffer 31 at the bit rate "Rv2". When video streams of Clip-2 are supplied to the video buffer 22, the larger the term β in the expression (7), the longer the time Y (=Tvs2-Tms2) in FIG. 11 is, so that the time (SCR_video2_start) at which input of video data in Clip-2 to the video buffer 22 ends can be reached more slowly.

Figure 13:
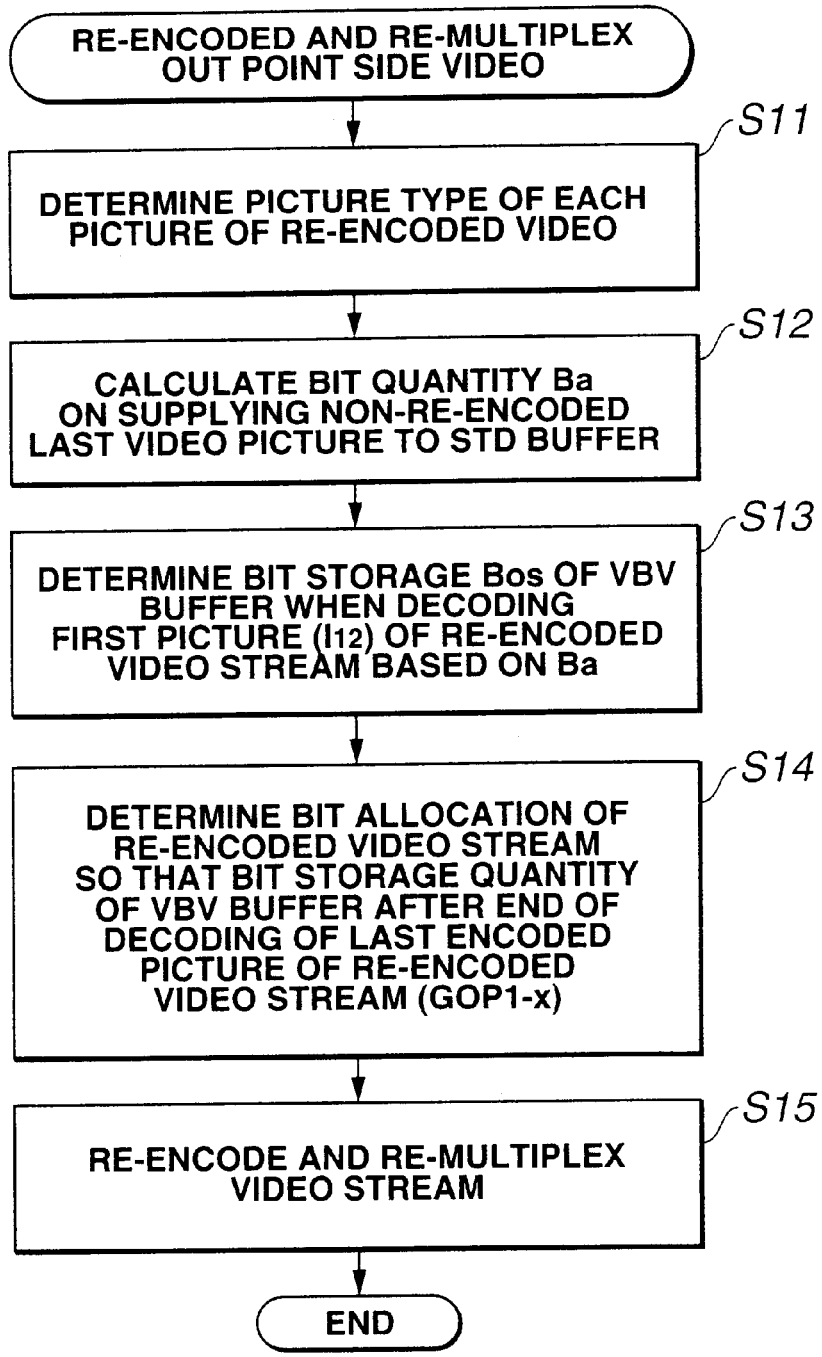
FIG. 13 is a flow chart of operations effected by the moving picture recording and/or reproducing apparatus for re-encoding a video stream of the outpoint-side program.

Next, the re-encoding and re-multiplexing of video streams in the outpoint-side program, effected at step S2 by the moving picture reproducing and/or reproducing apparatus 1, will be described herebelow with reference to FIG. 13:

As in FIG. 13, first at step S11, the video encoder 13 determines the type of each picture in the video data to re-encode. That is, as shown in FIGS. 2a and 2c, when a picture $B_{14}$ is an outpoint picture Pout, the video encoder 13 changes the picture type for re-encoding so that the picture $B_{14}$ predictive-encoded based on a picture $B_{18}$ can be made with no predictive reference.

Next at step S12, the video encoder 13 calculates a bit storage quantity Ba when input to the video buffer 22 (STD buffer) of the system target decoder 20 of the last picture of a non-re-encoded outpoint-side multiplexed video stream ends.

More specifically, the last picture in the non-re-encoded video stream is a data just before re-encoded, namely, $B_{07}$ in GOP(0) shown in FIG. 2c.

Figure 14:
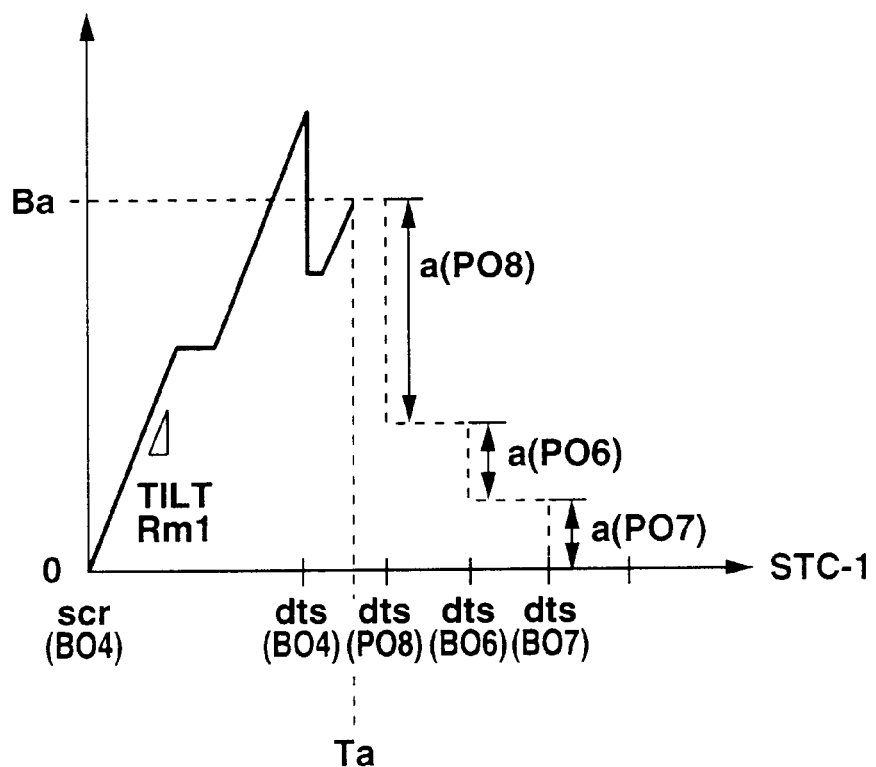
FIG. 14 shows a relation between quantity of bits stored in the STD video buffer when the outpoint-side video stream ( . . . , $B_{o7}$) is supplied, and STC-1 according to SCR added to a video pack.

FIG. 14 shows a relation between quantity of bits stored in the video buffer 22 (bit storage quantity of the STD video buffer) for supplying the outpoint-side video streams (..., $B_{07}$) shown in FIG. 2c, and STC-1 according to SCR added to a video pack and generated by the timing generator 28. FIG. 14 shows a bit storage quantity when a video pack including pictures $B_{04}$, $B_{08}$, $B_{06}$ and $B_{07}$ is supplied to the video buffer 22.

In FIG. 14, scr($B_{04}$) is a time when a video pack including the picture $B_{04}$ is first supplied to the system target decoder 20. When STC-1 supplied from the timing controller 28 coincides with scr($B_{04}$), input of the video pack to the system target decoder 20 is started according to SCR, and the video pack is decoded by the video decoder 24 according to DTS appended to each picture. That is, the video decoder 24 decodes the picture $B_{04}$ when a time dts($B_{04}$) is reached, the picture $B_{08}$ when a time dts($P_{08}$) is reached, the picture $B_{06}$ when a time dts($P_{06}$) is reached, and the picture $B_{07}$ when a time dts($B_{07}$) is reached.

The bit storage quantity Ba of the video buffer 22 (STD buffer) which should be at a time Ta when the input of the last picture $B_{07}$ included in GOP(0) to the system target decoder 20 ends, is calculated.

Also, access unit sizes a($P_{08}$), a($P_{06}$) and a($P_{07}$) of the pictures $P_{08}$, $B_{06}$ and $B_{07}$, respectively, to decode after the time Ta are examined.

In the example shown in FIG. 14, when STC-1 coincides with scr($B_{04}$), the calculation of the bit storage quantity Ba is started. However, the calculation of the bit storage quantity Ba may be started before the time scr($B_{04}$). In effect, it suffices that at least one DTS exists between the start time of the calculation of the bit storage quantity Ba and time Ta. The calculation of the bit storage quantity may be started beginning with an picture 102 for example in FIG. 2c.

Next at step S13 in FIG. 13, the vide encoder 13 determines, based on the bit storage quantity Ba having been calculated at step S12, a bit storage quantity Bos of the VBV buffer 31 for decoding the first picture in the video stream to re-encode.

More specifically, the first picture in the video stream to re-encode is a picture $I_{12}$ of GOP(1-x) in FIG. 2c.

FIG. 15 shows a relation between quantity of bits stored in the VBV video buffer 31 when the inpoint-side video stream ($I_{12}, \ldots$) shown in FIG. 2c are supplied, and SCR-1 generated by the timing controller 28 according to SCR added to a video pack. FIG. 15 shows stored bit quantities in the VBV buffer 31 when this buffer is supplied with pictures $B_{08}$, $B_{06}$, $B_{07}$, $I_{12}$, $B_{10}$, $B_{11}$, $P_{14x}$ and $P_{13x}$.

The video encoder 13 determines an initial bit storage quantity Bos of the VBV buffer 31 for decoding the first picture $I_{12}$ in the video stream to re-encode. At this time, the video encoder 13 first sets the bit storage quantity of the VBV buffer 31, which should be at the time dts($P_{08}$) to the value Ba. When the bit storage quantity Ba is larger than 1.75 Mbits, the bit storage quantity Ba is set to 1.75 Mbits.

Further, based on the bit storage quantity Ba having been set as in the above, access unit sizes a($P_{08}$), a($B_{06}$) and $_a$($B_{07}$) of the pictures $P_{08}$, $B_{06}$ and $B_{07}$, examined at step S13 and the bit rate Rv1, the video encoder 13 determines the bit storage quantity Bos of the VBV buffer 31, which should be at the time dts($I_{12}$) when decoding of one ($B_{07}$) of the pictures $P_{08}$, $B_{06}$ and $B_{07}$ by the video decoder 24 ends.

Next at step S14, the video encoder 13 determines a bit storage quantity Bend1 which should be for decoding of the last picture ($P_{13x}$) of the video stream to re-encode ends. Then, the video encoder 13 determines an allocated bit amount for a video stream to re-encode so that the bit storage quantity Bend1 of the VBV buffer 31 will be larger than the bit storage quantity Bvsd of the VBV buffer 31 for decoding the picture in the inpoint-side video stream.

At step S15, based on the allocated bit amount determined at step S14 for the video stream, the video encoder 13 re-encodes the outpoint-side video stream, and the multiplexer 14 re-multiplexes the re-encoded video stream.

Figure 16:
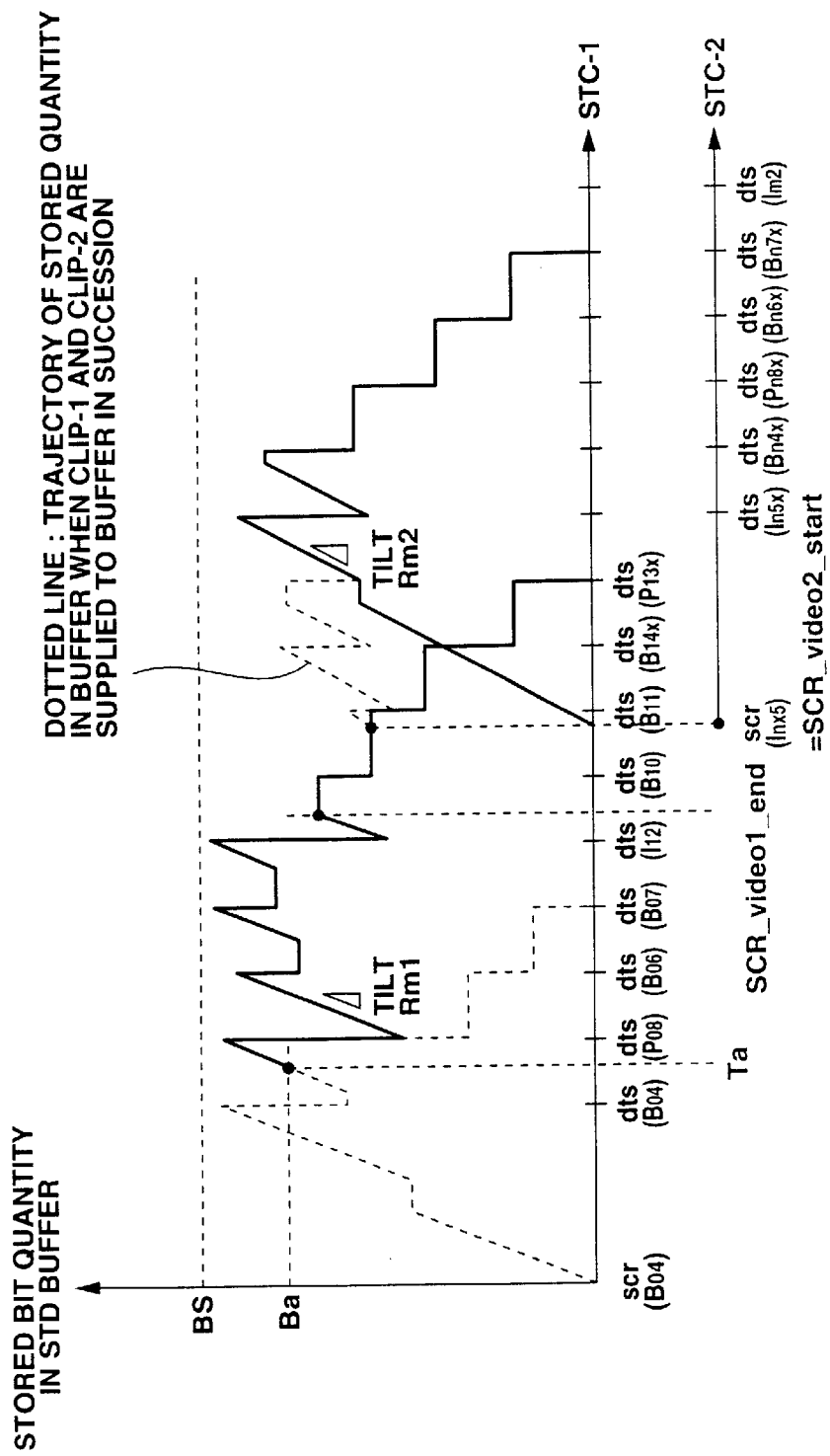
FIG. 16 shows a relation between quantity of bits stored in the STD video buffer when the outpoint-side video stream is supplied and then the inpoint-side video stream is supplied, and STC-1 and STC-2.

For the re-multiplexing, the multiplexer 14 will multiplex the video streams having been re-encoded for a time period from the time Ta until a time SCR_video1_end at which input of the last video pack on the outpoint side to the demultiplexer 21 ends, as shown in FIG. 16. Thereby, the multiplexer 14 multiplexes Clip-1 consisting of Clip-A and bridge sequence-A.

FIG. 16 shows a relation between bit storage quantity of the STD video buffer 22 for supplying the outpoint-side video stream and then the inpoint-side video stream is supplied, and STC-1 and STC-2. In FIG. 16, the vertical axis indicates the bit storage quantity of the video buffer 22 (STD buffer), BS is 232 kbytes in the MPEG-2 MP@ML for example, and the horizontal axis indicates STC-1 and STC-2 generated by the timing controller 28. Also in FIG. 16, the dotted line indicates a bit storage quantity depicting a trajectory along which STC-1 and STC-2 are successively supplied to the video buffer 22.

Figure 17:
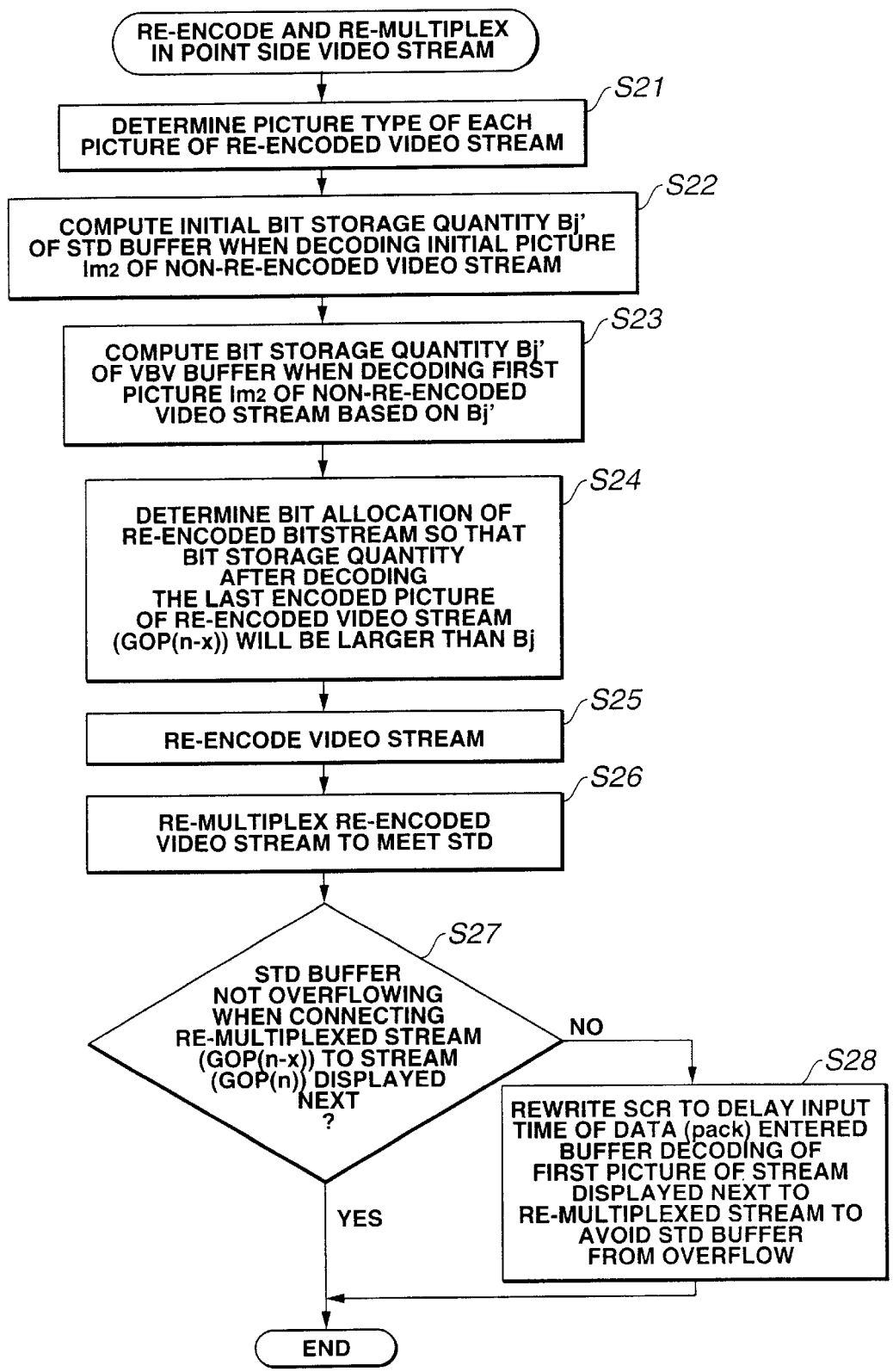
FIG. 17 is a flow chart of operations effected by the moving picture recording and/or reproducing apparatus when re-encoding and re-multiplexing video streams of the inpoint-side program.

Next, re-encoding and re-multiplexing of the inpoint-side program, effected by the moving picture recording and/or reproducing apparatus 1 at step S3 will be described herebelow with reference to FIG. 17. FIG. 17 is a flow chart of operations of the moving picture recording and/or reproducing apparatus 1 in re-encoding and re-multiplexing video streams of the inpoint-side program.

As shown in FIG. 17, first at step S21, the video encoder 13 determines the type of each picture in the video data to re-encoded.

Namely, as having previously been described with reference to FIGS. 2b and 2d, the video encoder 13 changes the picture type to I picture so that when the picture $B_{n4}$ for example is an inpoint picture (Pin), a picture $P_{n5}$ having been predictive-encoded based on a picture $I_{n2}$ can be made without predictive reference.

Next at step S22, the video encoder 13 calculates an initial bit storage quantity Bj' which should be when the first picture of a video stream being an inpoint-side multiplexed stream and having not yet been re-encoded is supplied to the video buffer 22 (STD buffer) of the system target decoder 20.

More particularly, the first picture in the video stream not yet re-encoded is a data immediately after GOP(n) to re-encode, that is, a picture $I_{m2}$ of GOP(m) shown in FIG. 2d.

Figure 18:
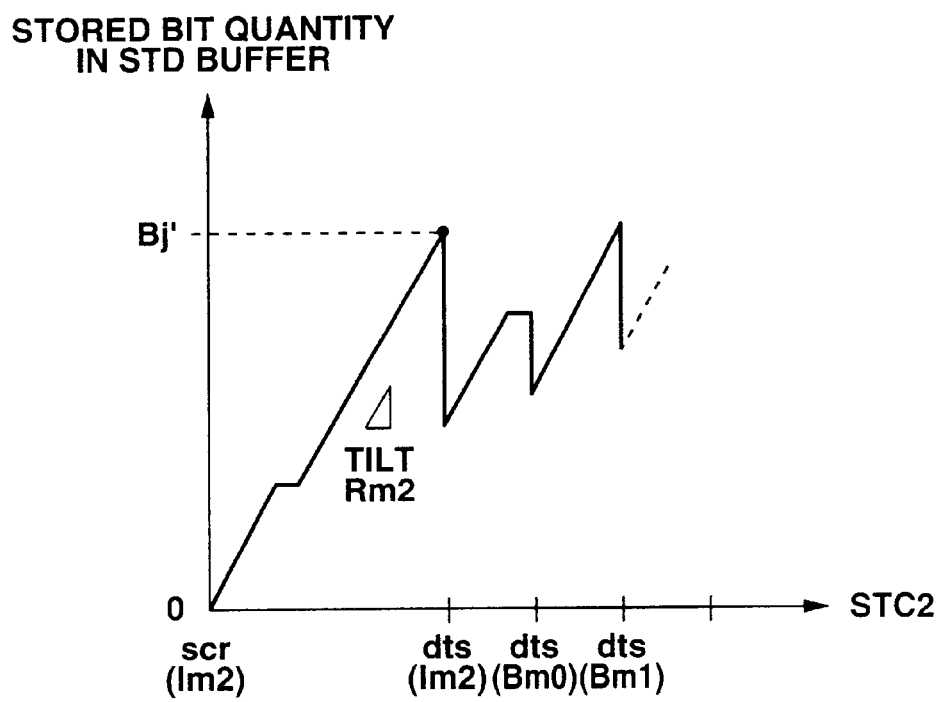
FIG. 18 shows a relation between quantity of bits stored in the STD buffer when the inpoint-side video stream ($I_{m2}$, $I_{m0}$, . . . ) is supplied, and STC-2 according to SCR added to a video pack.

FIG. 18 shows a relation between a bit storage quantity of the video buffer 22 (bit storage quantity of the STD buffer) which should be when the inpoint-side video streams ($I_{m2}$, $I_{m0}$, . . . ) shown in FIG. 2d are supplied and STC-2 according to SCR added to a video pack and generated by the timing controller 28. FIG. 18 shows a bit storage quantity of the video buffer when supplied with the video pack consisting of pictures $I_{m2}$, $B_{m0}$ and $B_{m1}$.

In FIG. 18, scr($I_{m2}$) is a time when a video pack including the picture $I_{m2}$ is first supplied to the system target decoder 20. Input of the video pack to the system target decoder 20 according to SCR starts when STC-2 from the timing controller 28 coincides with scr($I_{m2}$), and the video pack is decoded by the video decoder 24 according to DTS appended to each picture. Namely, the video decoder 24 decodes the picture $I_{m2}$ when the time dts($I_{m2}$) is reached, the picture $B_{m0}$ when the time dts($B_{m0}$) is reached, and the picture $B_{m1}$ when the time dts($B_{m1}$) is reached. The video encoder 13 calculates an initial bit storage quantity Bj' of the video buffer 22 (STD buffer) which should be at the time dts($I_{m2}$).

Next at step S23, the video encoder 13 determines, based on the initial bit storage quantity Bj' calculated at step S22, a bit storage quantity Bj of the VBV buffer 31 for decoding the first picture in the video stream to re-encode.

More specifically, the first picture in the video stream not re-encoded is a picture $I_{m2}$ in GOP(m) in FIG. 2d. In this embodiment, the initial bit storage quantity Bj of the VBV buffer 31 is taken as the bit storage quantity Bj' determined at step S22. When the bit storage quantity Bj' is larger than 1.75 Mbits, the bit storage quantity Bj is 1.75 Mbits.

Next at step S24, the video encoder 13 determines an allocated bit amount of a video data to re-encode so that the bit storage quantity of the VBV buffer 31 after the last picture to re-encode is decoded is larger than the initial bit storage quantity Bj.

Figure 19:
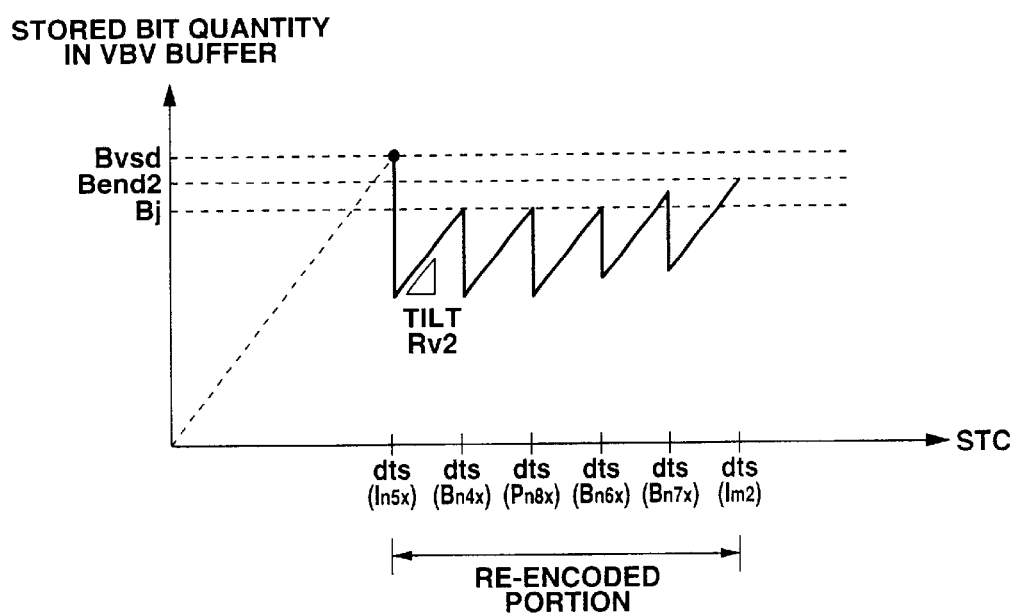
FIG. 19 explains how to determine an allocated bit quantity so that bit storage quantity Bend2 the VBV buffer should have at a time when a picture $B_{n7x}$ included in GOP(n-x) being a GOP to re-encode, becomes larger than a bit storage quantity Bj.

More specifically, as shown in FIG. 19, the video encoder 13 will determine an allocated bit amount so that the bit storage quantity Bend2 which should be at a time when decoding of a picture $B_{n7x}$ included in GOP(n-x) being a GOP to re-encode shown in FIG. 2d ends is larger than the bit storage quantity Bj.

At step S25, the video encoder 13 re-encodes, based on the allocated bit amount determined at step S24, GOP(n-x) being a GOP to re-encode, of the inpoint-side video stream.

Next at step S26, the video stream re-encoded at step S25 is re-multiplexed. At this time, the multiplexer 14 starts re-multiplexing the re-encoded Clip-2 video stream at the a time SCR_video2_start as shown in FIG. 16. At this time, the multiplexer 14 determines the time SCR_video2_start according to STC-2 generated by the timing controller 28 of the system target decoder 20 and re-multiplexes so that the video buffer 22 will not overflow.

At step S27, the moving picture recording and/or reproducing apparatus 1 judges whether or not the video buffer 22 (STD buffer) of the system target decoder 20 when the apparatus 1 shifts from the video stream re-multiplexed at step S26 to a video stream not yet re-multiplexed.

Namely, the multiplexer 14 will judge whether or not the video buffer 22 (STD buffer) will overflow when the re-multiplexed GOP(n-x) is concatenated to GOP(m) presented after the re-multiplexed GOP(n-x).

Figure 20:
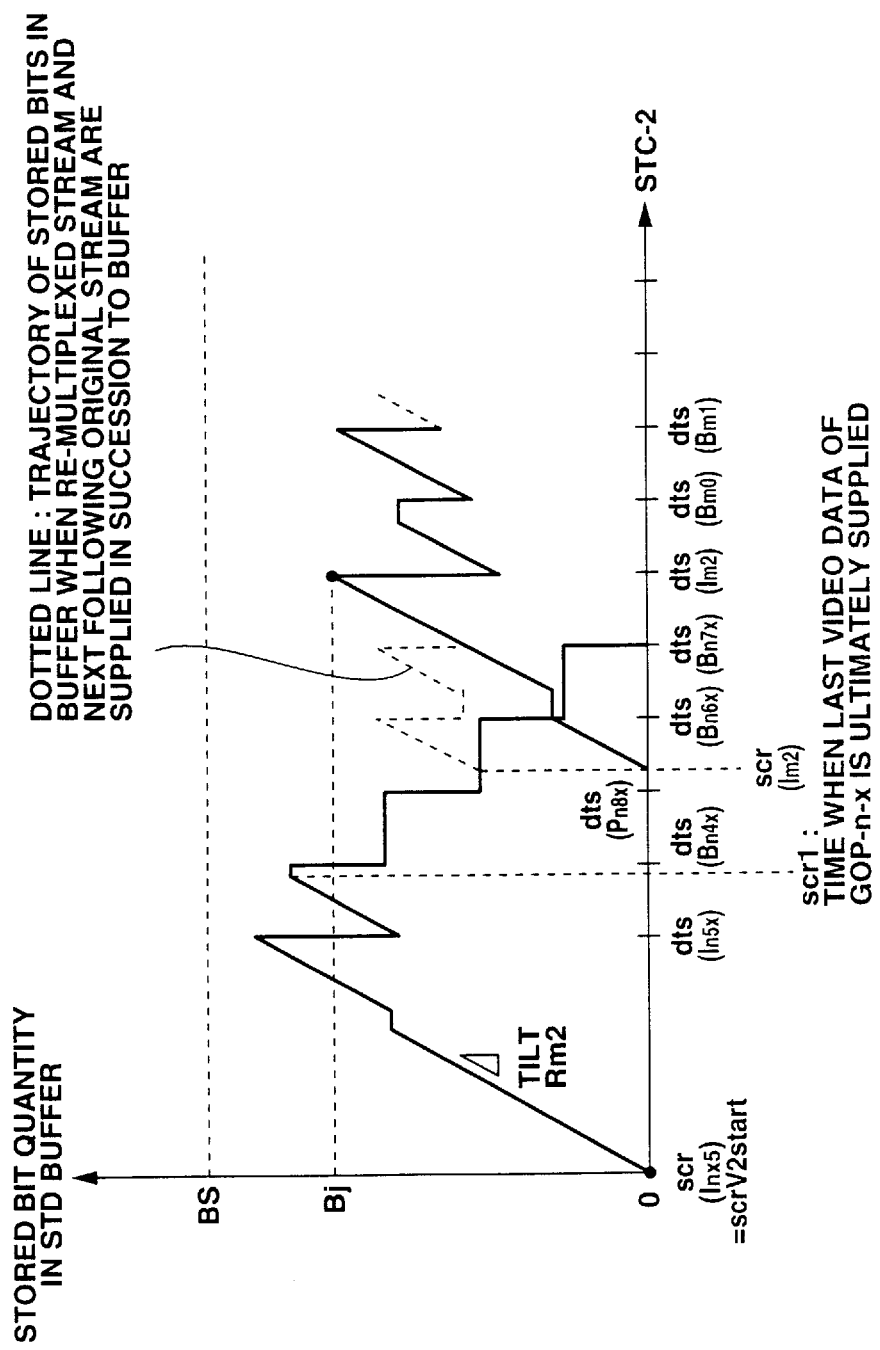
FIG. 20 shows a relation between STC-2 and bit storage quantity the STD video buffer should have when a video pack including a re-multiplexed inpoint-side GOP starts being supplied (SCR_video2_start) from a time scr($I_{n5x}$) and then video packs after the time scr($I_{m2}$) are supplied to the STD video buffer.

More particularly, as shown in FIG. 20 for example, if the bit storage quantity depicts a trajectory below the bit storage quantity BS as indicated with a dotted line when a video pack including the inpoint-side GOP re-multiplexed at the time scr($I_{n5x}$) starts being supplied as input (SCR_video2_start) and video streams following the video stream re-multiplexed at the time scr($I_{m2}$) start being successively supplied as input, the picture $I_{m2}$ starts being decoded at the time dts($I_{m2}$) with the video buffer 22 (STD buffer) not overflowing.

Figure 21:
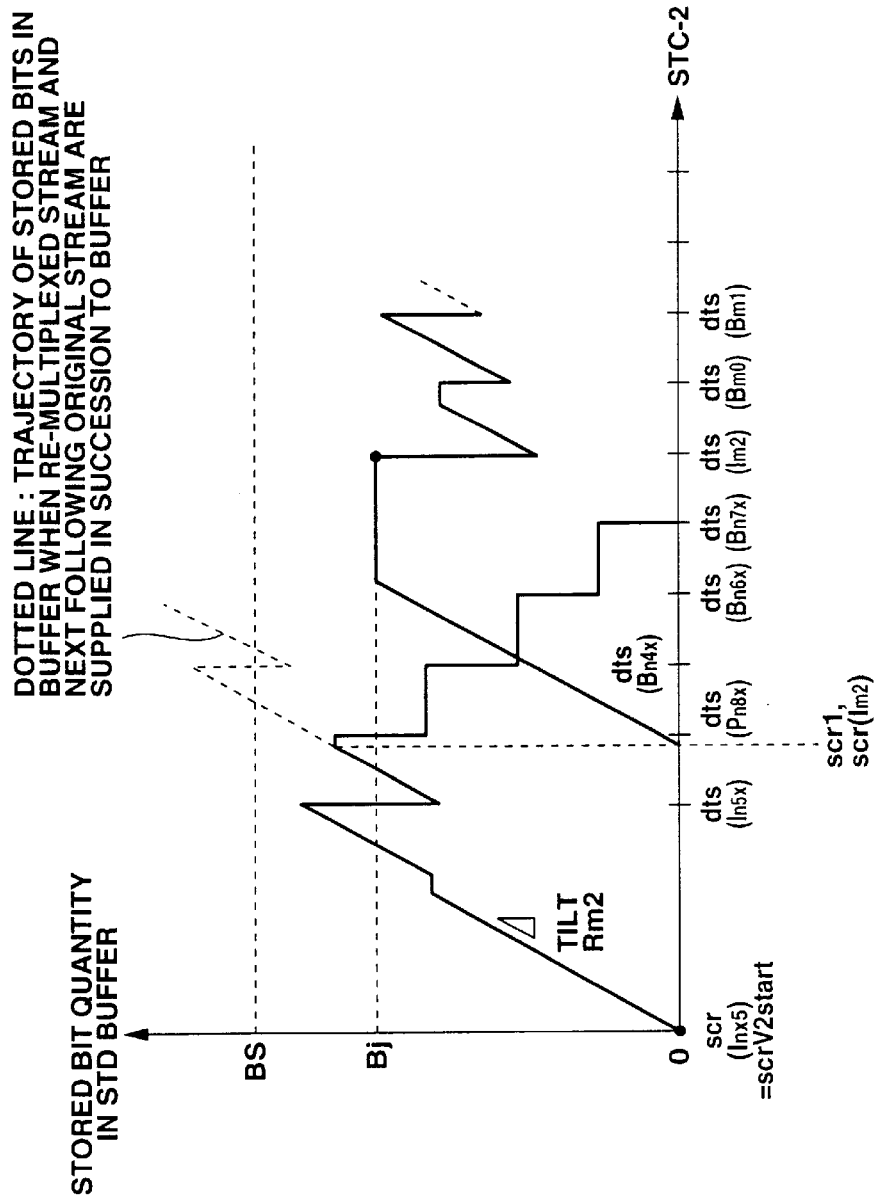
FIG. 21 shows a relation between STC-2 and quantity of bits stored in the STD video buffer when a video pack including a re-multiplexed inpoint-side GOP starts being supplied (SCR_video2_start) from the time scr($I_{n5x}$) and then video packs after a time scr($I_{m2}$) are supplied to the STD video buffer.

On the other hand, a shown in FIG. 21, if the bit storage quantity depicts a trajectory below the bit storage quantity BS as indicated with a dotted line in FIG. 21 when a video pack including inpoint-side GOP re-multiplexed at the time scr($I_{n5x}$) starts being supplied as input (SCR_video2_start) and video streams following the video stream re-multiplexed at the time scr($I_{m2}$) start being successively supplied to the video buffer 22, the video buffer 22 (STD buffer) will overflow. That is, as having been described in the above with reference to FIG. 20, if the moving picture recording and/or reproducing apparatus 1 decides, when following the re-multiplexed video stream, video streams start being supplied as input at the time scr($I_{m2}$), that the video buffer 22 (STD buffer) will not overflow, the multiplexer 14 will end the operations. As having been described in the above with reference to FIG. 21, if the moving picture recording and/or reproducing apparatus 1 decides, when following the re-multiplexed video stream, video streams start being supplied as input at the time scr($I_{m2}$), that the video buffer 22 (STD buffer) will overflow, the operation goes to step S28.

At step S28, the multiplexer 14 rewrites SCR appended to a video pack in order to delay the time at which a video pack is supplied as input before the time when the first picture of the video stream presented following the re-multiplexed video stream is decoded, so that the video buffer 22 (STD buffer) will not overflow.

Figure 22:
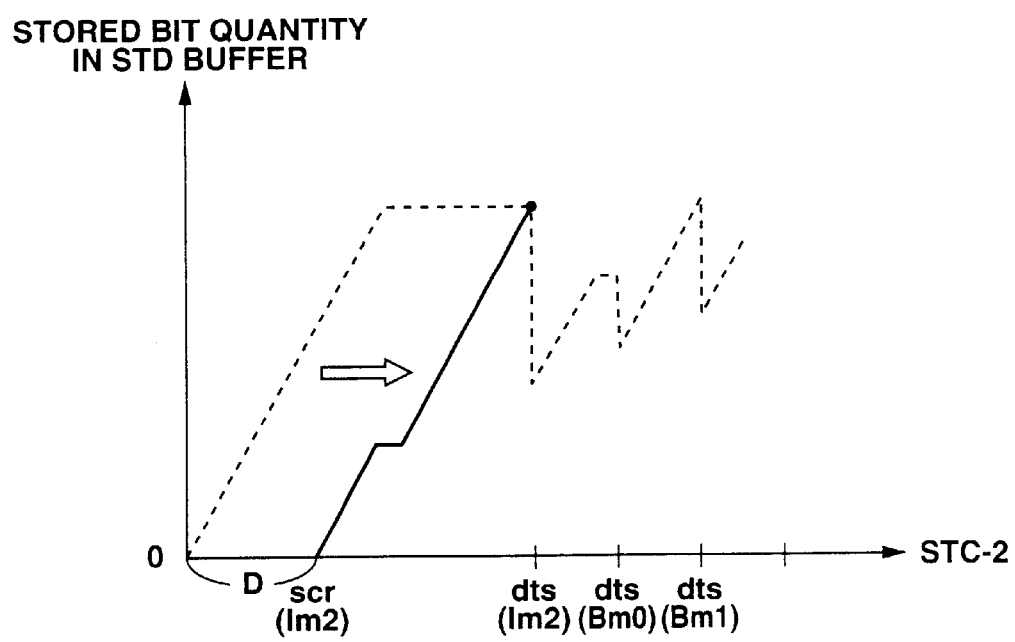
FIG. 22 explains how to rewrite SCR added to a video pack so that an inpoint-side video data is supplied to the video buffer with a delay of a predetermined time.

More particularly, the multiplexer 14 rewrites SCR appended to the video pack including the picture Im2 so that while the picture $I_{m2}$ starts being supplied as input at a time when STC-2 is "0" as indicated with a dotted line in FIG. 22, GOP(m) including the picture $I_{m2}$ is supplied to the video buffer 22 at a new time scr($I_{m2}$) delayed a time indicated with D in FIG. 22 from the time of input of the picture $I_{m2}$, thereby ending the operation with starting decoding of the picture $I_{m2}$ at the time dts($I_{m2}$).

As having previously been described with reference to FIG. 13, the moving picture recording and/or removing apparatus 1 effecting the above-mentioned operations calculates a bit storage quantity Ba of the video buffer 22 (STD buffer), which should be when input of the last picture (picture $B_{07}$ in FIG. 2c) of the outpoint-side video stream not re-encoded to the video buffer 22 ends, and determines, based on the bit storage quantity Ba, an allocated bit amount by determining the bit storage quantity Bos of the VBV buffer 31 for decoding the first picture (picture $I_{12}$ in FIG. 2c) of the video stream re-encoded based on the bit storage quantity Ba. Thus, the outpoint-side video streams can be re-encoded and re-multiplexed of the video buffer 22 not to overflow and underflow when decoding the first picture (picture $I_{12}$ in FIG. 2c) in the re-encoded outpoint-side video stream.

As having previously been described with reference to FIG. 17, the moving picture recording and/or reproducing apparatus 1 calculates a bit storage quantity Bj' of the video buffer 22 (STD buffer) for decoding the first picture (picture $I_{m2}$ in FIG. 2d) in the inpoint-side video stream not re-encoded, and determines, based on the bit storage quantity Bj', a bit storage quantity Bj of the VBV buffer 31 for decoding the first picture (picture $I_{m2}$ in FIG. 2d) in the video stream not re-encoded. Thus, the inpoint-side video stream can be re-encoded and re-multiplexed of the video buffer 22 (STD buffer) not to overflow and underflow when decoding the first picture (picture $I_{m2}$ in FIG. 2d) in the video stream not re-encoded.

Therefore, for reproduction of Clip-1 and Clip-2 by concatenating them, the moving picture recording and/or reproducing apparatus 1 can reproduce Clip-1 and Clip-2 with no seam between them by re-encoding and re-multiplexing inpoint- and outpoint-side video streams without overflowing and underflowing of the video buffer 22, even with no referencing to information indicative of an initial status of a video buffer appended to each picture.

Note that the operations at step S27 and S28 may not be effected but the multiplexer 14 at step S26 may be allowed to re-multiplex at step S26 a range including not only the re-encoded video streams but also video packs supplied to the system target decoder 20 for a period from the time SCR_video2_start until the time when decoding of the first picture not re-encoded starts. Namely, the multiplexer 14 may be allowed to re-multiplex video packs supplied to the system target decoder 20 for a period from the time SCR_video2_start until the time dts($I_{m2}$) as shown in FIG. 16. Thus, the multiplexer 14 can prevent overflow of the video buffer 22, which would take place when re-multiplexing re-encoded inpoint-side video streams, and has not to rewrite SCR appended to each video pack.

Next, another example of re-encoding and re-multiplexing effected in the moving picture recording/and reproducing apparatus 1 will be described herebelow:

FIGS. 23a to 23d show together the example of re-encoding of an outpoint-side video stream by the video encoder 13.

When a picture $B_{11}$ of GOP(1) of outpoint-side video streams recorded in the optical disc 2 is designated as an outpoint picture (Pout) as shown in FIG. 23a, the video encoder 13 re-encodes the outpoint-side video stream as shown in FIGS. 23b, 23c or 23d.

As shown in FIG. 23b, the video encoder 13 re-encodes only GOP(1) of the outpoint-side video stream. That is, the video encoder 13 re-encodes a picture $B_{10}$ of GOP(1) to an I picture $I_{10x}$, and an outpoint picture $B_{11}$ to a P picture $P_{11x}$, to generate a new GOP(1-x).

Also, as shown in FIGS. 23c and 23d, the video encoder 13 re-encodes two GOPs, namely, GOP(0) and GOP(1).

As shown in FIG. 23c, the video encoder 13 re-encodes one GOP(0) and GOP(1) as one GOP(a-x). At this time, the video encoder 13 will copy pictures $I_{02}$ to $B_{07}$ of GOP(0) to GOP(a-x), re-encode the pictures $B_{10}$ and $B_{11}$ of GOP(1) to P pictures $P_{10x}$ and $P_{11x}$, respectively, of GOP(a-x).

As shown in FIG. 23d, the video encoder 13 re-encodes GOP(0) and GOP(1) to two GOPs, namely, GOP(a-x1) and GOP(a-x2). At this time, the video encoder 13 will copy pictures $I_{02}$ to $B_{04}$ of GOP(0) to GOP(a-x1), re-encode pictures $P_{08}$, $B_06$ and $B_{07}$ of GOP(0) to pictures $1_{8x}$, $B_{6x}$ and $B_{7x}$, respectively, of GOP(a-x2), and re-encode pictures $B_{10}$ and $B_{11}$ of GOP(1) to pictures $P_{10x}$ and $P_{11x}$ of GOP(a-x2). Note that in the example of re-encoding by the video encoder 13 shown in FIG. 23d, the maximum length of FOP is limited to 5 pictures.

For the above re-encoding, the video encoder 13 selects based on the limitation by the video buffer 22 included in the system target decoder 20, any one of the re-encoding shown in FIG. 23b and that shown in FIG. 23c or 23d.

FIGS. 24a to 24d show together an example of re-encoding of inpoint-side video streams.

When a picture $P_{n8}$ of GOP(n) of inpoint-side video streams recorded in the optical disc 2 is designated as an inpoint picture (Pin) as shown in FIG. 24a, the video encoder 13 re-encodes the inpoint-side video stream as shown in FIGS. 43b, 24c or 24d.

As shown in FIG. 24b, the video encoder 13 re-encodes only GOP(n) of the inpoint-side video stream. That is, the video encoder 13 re-encodes pictures $P_{n8}$, $P_{n6}$ and $B_{n7}$ of GOP(n) to I pictures $I^{8x}$, $B_{n6x}$ and $B_{n7x}$, respectively, to generate a new GOP(n-x).

Also, as shown in FIGS. 24c and 24d, the video encoder 13 re-encodes two GOPs, namely, GOP(n) and GOP(m).

As shown in FIG. 24c, the video encoder 13 re-encodes one GOP(n) and GOP(m) as one GOP(b-x). At this time, the video encoder 13 will re-encode pictures $P_{n8}$, $B_{n6}$ and $B_{n7}$ of GOP(n) to pictures $I_{n8}$x, $B_{n6x}$ and $B_{n7x}$, respectively, re-encode the picture $I_{m2}$ of GOP(m) to a P picture $P_{m2x}$, and re-encode a picture after the picture $I_{m2}$ of GOP(m) to a picture of the same type, to generate a new GOP(b-x).

As shown in FIG. 24d, the video encoder 13 re-encodes GOP(n) and GOP(m) to two GOPs, namely, GOP(b-x1) and GOP(b-x2). At this time, the video encoder 13 will re-encode pictures $P_{n8}$, $B_{n6}$ and $B_{n7}$ of GOP(n) to pictures $I_{n8x}$, $B_{n6x}$ and $B_{n7x}$, respectively, re-encode a picture $P_{m5x}$ of GOP(m) to a picture $I_{m5}$ of GOP(b-x2), and re-encode a picture after the picture $P_{m5}$ of GOP(m) to a picture of the same type.

For the above re-encoding, the video encoder 13 selects, based on the limitation by the video buffer 22 included in the system target decoder 20, any one of the re-encoding shown in FIG. 24b and that shown in FIG. 24c or 24d.

Figure 23:
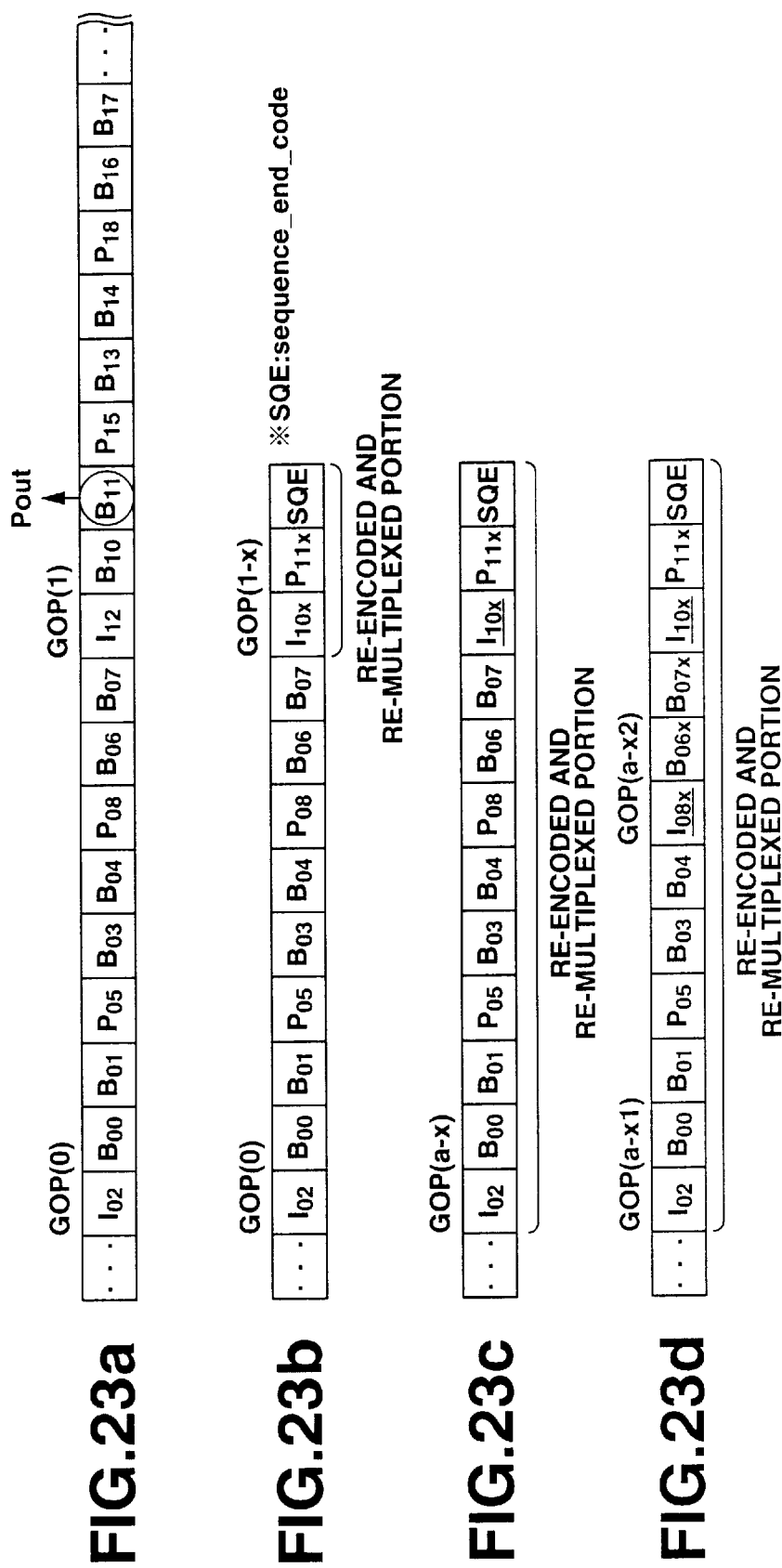
Figure 25:
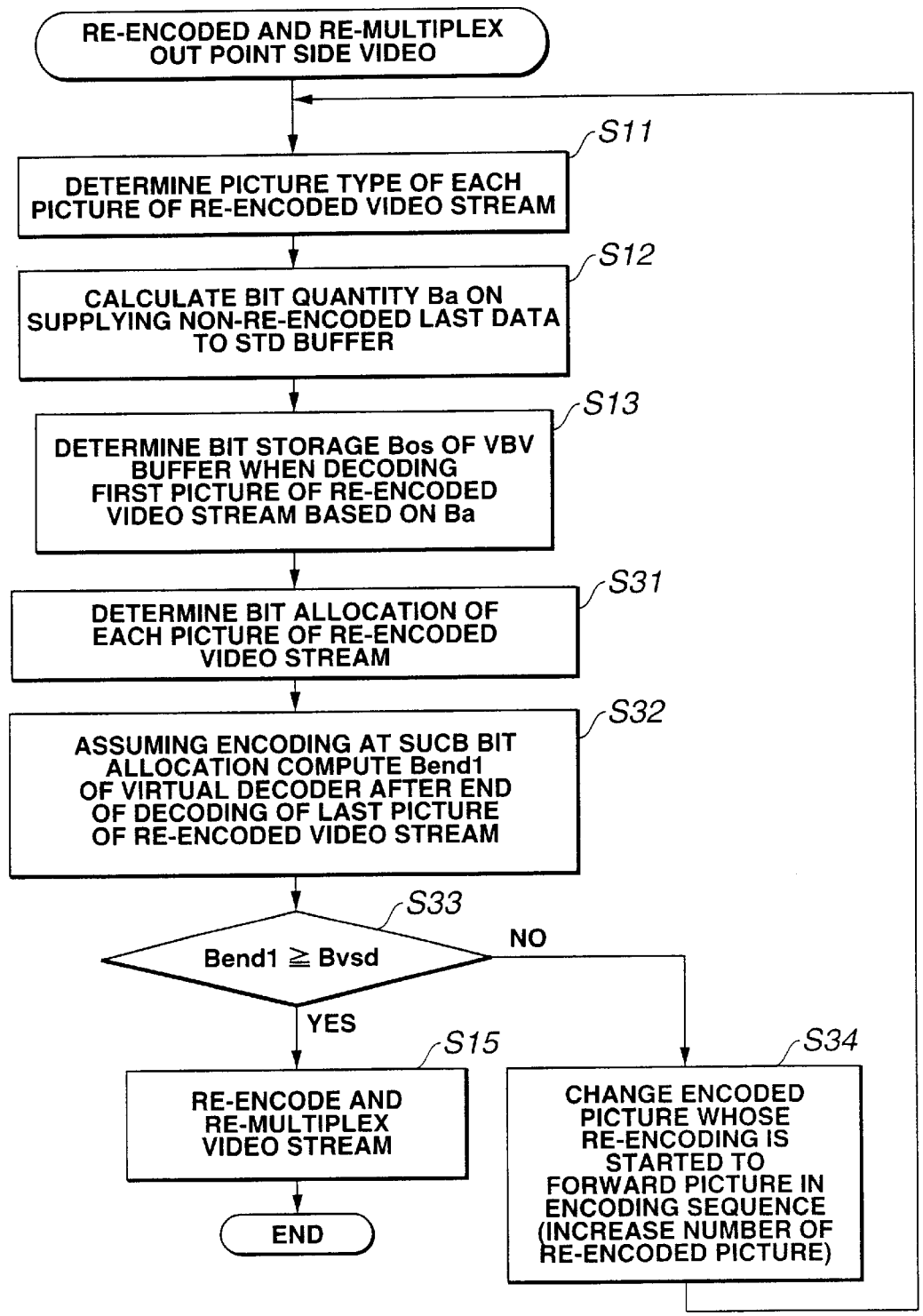
FIG. 25 is a flow chart of operations effected by the moving picture recording and/or reproducing apparatus for re-encoding by the video encoder having been described above with reference to FIG. 23 and re-multiplexing by the multiplexer.

Next, the operations for re-encoding by the video encoder 13, having been described in the above with reference to FIG. 23, and re-multiplexing by the multiplexer 14, will be described with reference to the flow chart shown in FIG. 25. In FIG. 25, the steps of the same operations as in the flow chart in FIG. 13 are indicated with the same references as in FIG. 13, and will not be described in detail.

As in FIG. 25, first the operations at steps S11 to 13 are effected.

That is, the video encoder 13 will determine, at step S11, the type of each picture in a video data to re-encode. Namely, as having previously been described with reference to FIGS. 23a and 23b, when the picture $B_{11}$ is an outpoint picture (Pout), the video encoder 13 determines the picture type for the picture $B_{10}$ to be a picture $I_{10}x$ and picture $B_{11}$ to be a picture $P_{11x}$ so that the picture $B_{11}$ predictive-encoded based on the picture $P_{15}$ can be made with no predictive referencing. The vide encoder 13 calculates the bit storage quantity Ba of the video buffer 22, which should be when the picture $B_{07}$ is supplied to the video buffer 22, and determines, based on the bit storage quantity Ba, the bit storage quantity Bos of the VBV buffer 31 at step S12 for decoding the picture $I_{10x}$. Then the video encoder 13 goes to step S31.

At step S31, the video encoder 13 determines an allocated bit amount for each of the pictures $I_{10x}$ and $P_{11x}$ of the video stream to re-encode.

Next at step S32, to re-encode with the allocated bit amount determined at step S31, the video encoder 13 calculates the bit storage quantity Bend1 of the VBV buffer 31, which should be after decoding the last picture $P_{11x}$ of the video stream to re-encode.

At step S33, the video encoder 13 makes comparison in size between the bit storage quantity Bend1 calculated at step S32 and the initial bit storage quantity Bvsd of the VBV buffer 31 for decoding the first picture in the inpoint-side video stream to re-encode. The initial bit storage quantity Bvsd is the bit storage quantity of the VBV buffer 31 for decoding the picture In8x as in FIG. 24.

When the video encoder 13 has judged that the bit storage quantity Bend1 is larger than the initial bit storage quantity Bvsd, it goes to step S15. When it has judged that the bit storage quantity Bend1 is smaller than the initial bit storage quantity Bvsd, it goes to step S34.

An example of a judgment made by the video encoder 13 at step S33, that the bit storage quantity Bend1 is larger than the initial bit storage quantity Bvsd, is shown in FIG. 25.

Figure 26:
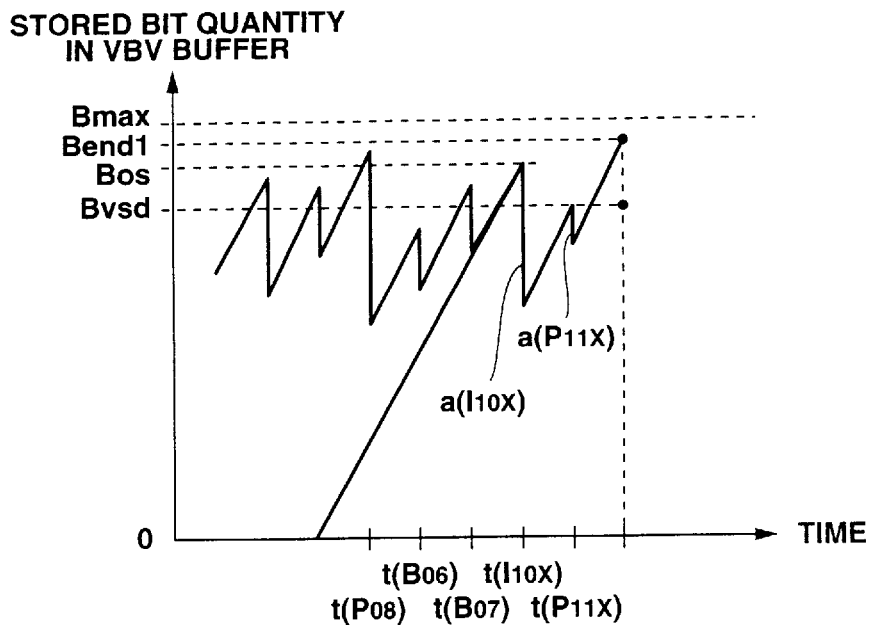
FIG. 26 explains an example that the bit storage quantity Bend1 is judged by the video encoder to be larger than the initial bit storage quantity Bvs.

In FIG. 26, t( ) on the horizontal time base indicates a time when a picture to re-encode is decoded. For example, $t(P_{08})$ indicates a time when a picture $P_{08}$ is decoded. Also in FIG. 26, a( ) indicates a bit amount of a picture. For example, $a(I_{10x})$ indicates a bit amount of a picture $I_{10x}$. As shown in FIG. 26, if allocated bit amounts are determined by the video encoder 13 at step S31 for the pictures $I_{10x}$ and $P_{11x}$ in the video stream to re-encode, the data amounts indicated with $a(I_{10x})$ and $a(P_{11x})$, respectively, are deleted from the buffer when the pictures $I_{10x}$ and $P_{11x}$ are decoded, and the video encoder 13 judges that the bit storage quantity Bend1 is larger than the initial bit storage quantity Bvsd. The video encoder 13 goes to step S15 where GOP(1-x) shown in FIG. 23b will be re-encoded.

Figure 27:
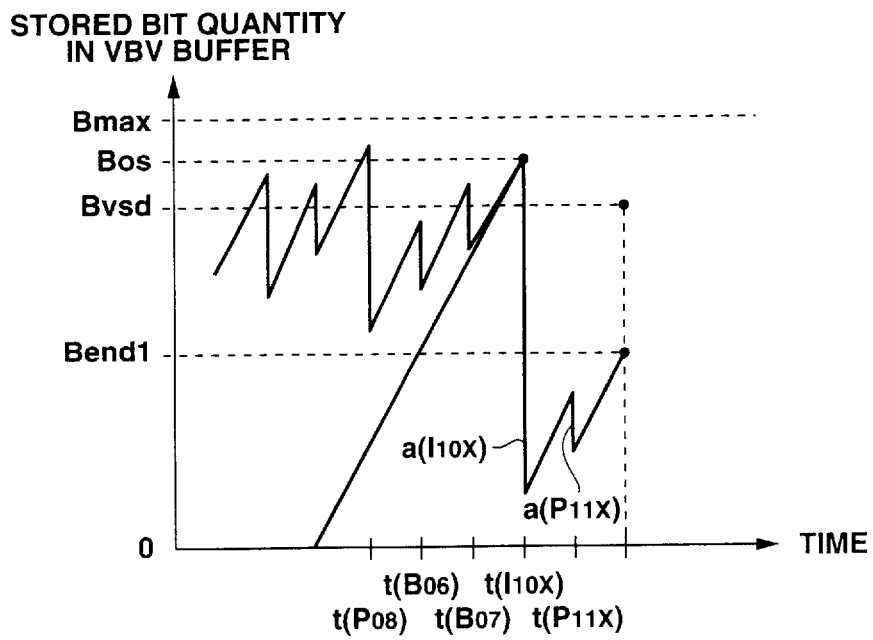
FIG. 27 explains an example that the bit storage quantity Bend1 is judged by the video encoder to be smaller than the initial bit storage quantity Bvsd.

An example of a judgment made by the video encoder 13 at step S33, that the bit storage quantity Bend1 is smaller than the initial bit storage quantity Bvsd, is shown in FIG. 27.

As shown in FIG. 27, if allocated bit amounts are determined by the video encoder 13 at step S31 for the pictures $I_{10x}$ and $P_{11x}$ in the video stream to re-encode, the data amounts indicated with $a(I_{10})$ and $a(P_{11x})$, respectively, are deleted from the buffer when the pictures $I_{10x}$ and $P_{11x}$ are decoded, and the video buffer 13 judges that the bit storage quantity Bend1 is smaller than the initial bit storage quantity Bvsd. The video encoder 13 goes to step S34.

At step S15, the video encoder 13 re-encodes the outpoint-side video stream shown in FIG. 23b.

At step S34, the video encoder 13 changes the picture with which re-encoding starts to a picture belonging to a preceding GOP in the re-encoded order of GOPs. Namely, the video encoder 13 changes the picture $I_{10x}$ to re-encode as shown in FIG. 23b to a picture $P_{10x}$ belong to a preceding GOP(0), and changes a number of pictures to re-encode, thereby generating a new GOP(a-x) to re-encode as shown in FIG. 23c.

The video encoder 13 may be adapted to generate GOP (a-x1) and GOP(a-x2) shown in FIG. 23d from GOP(0) and GOP(1-x) shown in FIG. 23b. The video encoder 13 returns from step S34 to S11 where it will make operations at steps S11 to S33 for a to-be-re-encoded video stream selected by changing at step S34, and re-encodes and re-multiplexes the video stream at step S15.

Figure 28:
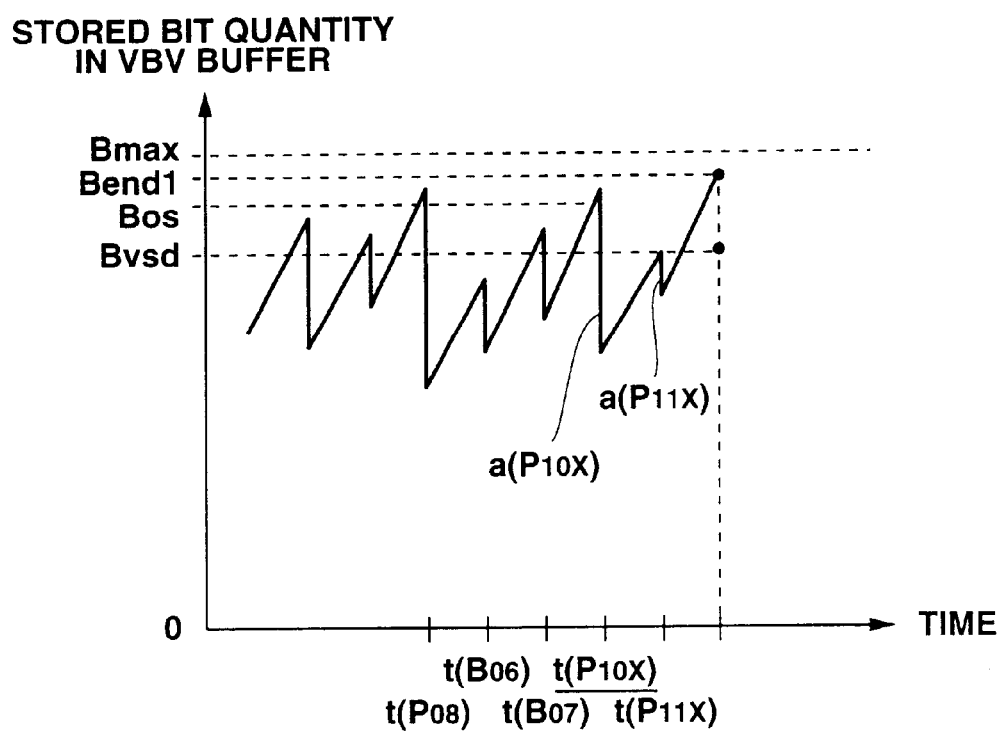
FIG. 28 explains how to change the bit storage quantity of the video buffer shown in FIG. 27.

By making the operation at step S34, the bit storage quantity of the video buffer 22 as shown in FIG. 25 is changed as shown in FIG. 28. As shown in FIG. 28, when the picture $I_{10x}$ in FIG. 23b is changed to the picture $P_{10x}$ shown in FIG. 23c and the allocated bit amounts are determined for the pictures $P_{10x}$ and $P_{11x}$ of the video stream to re-encoder again at step S31, the data mounts indicated with $a(P_{10x})$ and $a(P_{10x})$ when pictures $P_{10x}$ and $P_{11x}$ are deleted from the buffer and it is judged that the bit storage quantity Bend1 is larger than the initial bit storage quantity Bvsd. Then, the video encoder 13 goes to step S15 to re-encode GOP(a-x) shown in FIG. 23c where the re-encoding and re-multiplexing can be done.

Figure 24:
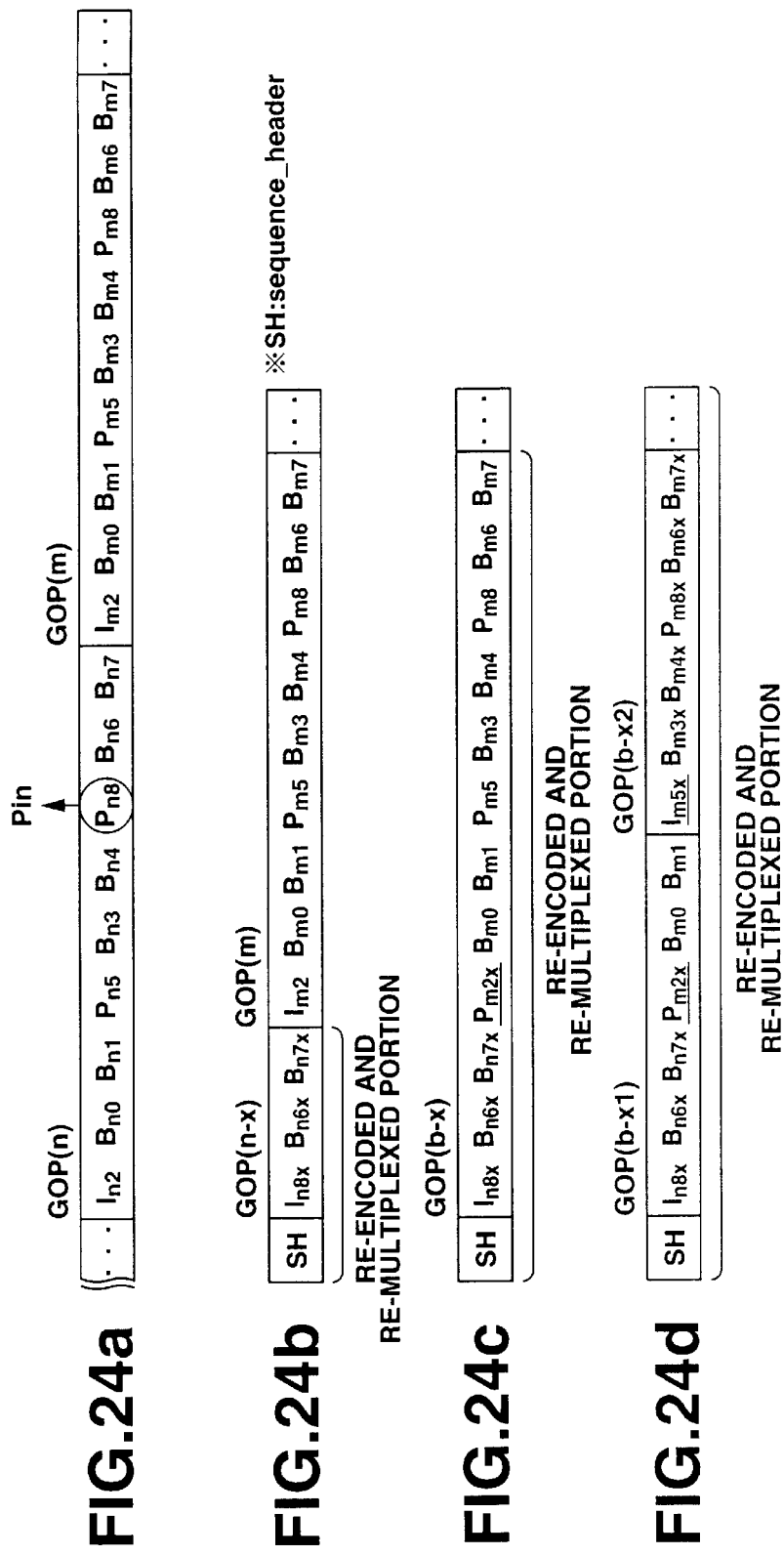
Figure 29:
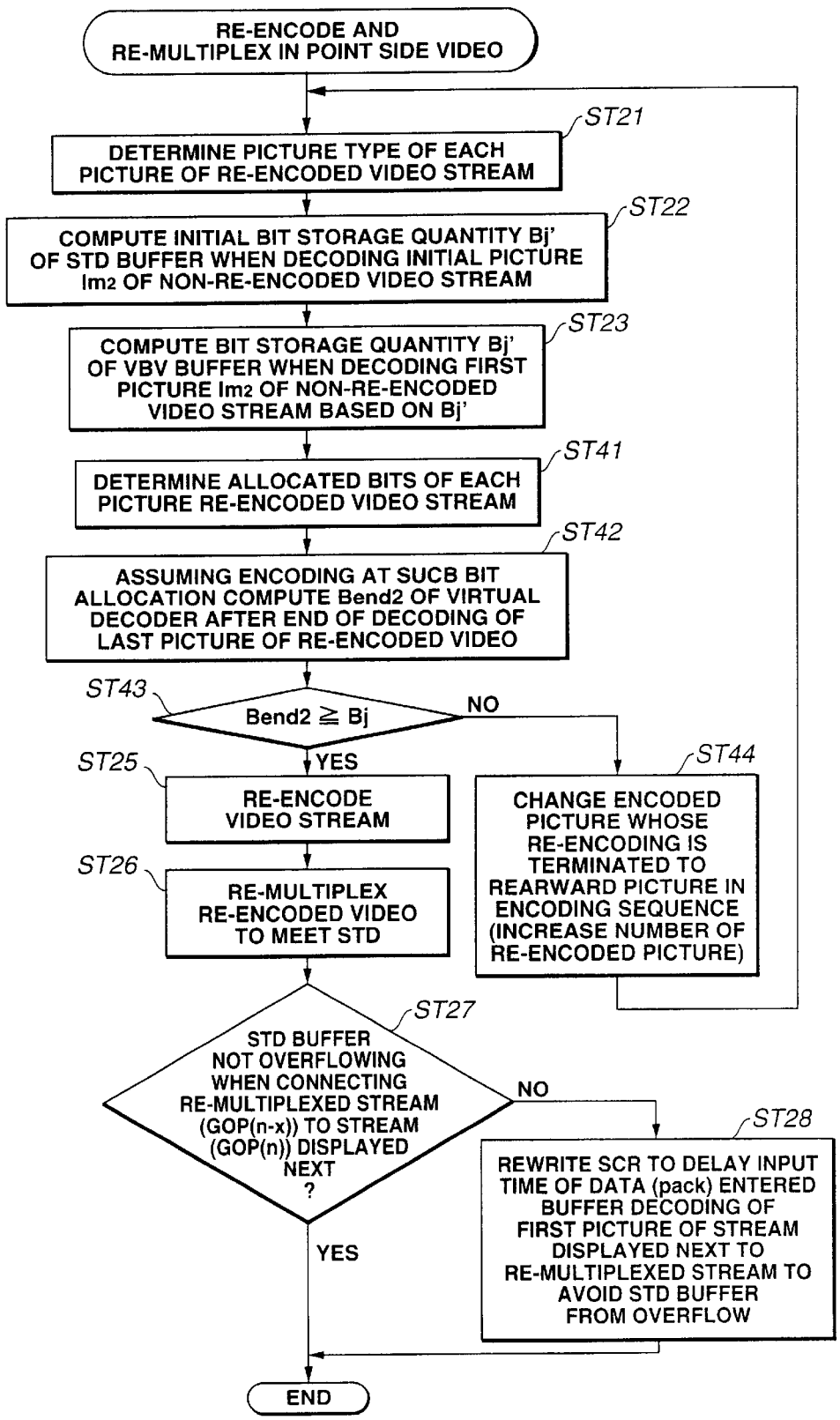
FIG. 29 is a flow chart of operations effected by the moving picture recording and/or reproducing apparatus for re-encoding by the video encoder having been described above with reference to FIG. 24 and re-multiplexing by the multiplexer.

Next, the operations for re-encoding by the video encoder 13 and re-multiplexing by the multiplexer 14, having previously been described with reference to FIG. 24, will be described with reference to the flow chart in FIG. 29. In FIG. 29, the steps of the same operations as in the flow chart in FIG. 17 are indicated with the same references as in FIG. 17, and will not be described in detail.

As in FIG. 29, first the operations at steps S21 to 23 are effected.

That is, the video encoder 13 will determine, at step S21, the type of each picture in a video data to re-encode. Namely, as having previously been described with reference to FIGS. 24a and 24b, when the picture $P_{n8}$ is an inpoint picture (Pin), the video encoder 13 determines the picture type for the picture $P_{n8}$ to be a picture $I_{n8x}$, picture $B_{n6}$ to be a picture $B_{n6x}$ and picture $B_{n7}$ to be a picture $B_{n7x}$ so that the picture $P_{n8}$ predictive-encoded based on the picture $P_{n5}$ can be made with no predictive referencing. The vide encoder 13 calculates the initial bit storage quantity Bj' for decoding the picture $I_{m2}$ at step S22, and determines the initial bit storage quantity Bj of the VBV buffer 31 for decoding the picture $I_{m2}$ based on the initial bit storage quantity Bj' at step S23. Then the video encoder 13 goes to step S41.

At step S41, the video encoder 13 determines an allocated bit amount for each of the pictures $I_{n8x}$, $B_{n6x}$ and $B_{n7x}$ of the video stream to re-encode.

Next at step S42, to re-encode with the allocated bit amount determined at step S41, the video encoder 13 calculates the bit storage quantity Bend2 of the VBV buffer 31, which should be after decoding the last picture $B_{n7x}$ of the video stream to re-encode.

At step S43, the video encoder 13 makes comparison in size between the bit storage quantity Bend2 calculated at step S42 and the initial bit storage quantity Bj.

When the video encoder 13 has judged that the bit storage quantity Bend2 is larger than the initial bit storage quantity Bj, it goes to step S25. When it has judged that the bit storage quantity Bend2 is smaller than the initial bit storage quantity Bj, it goes to step S44.

Figure 30:
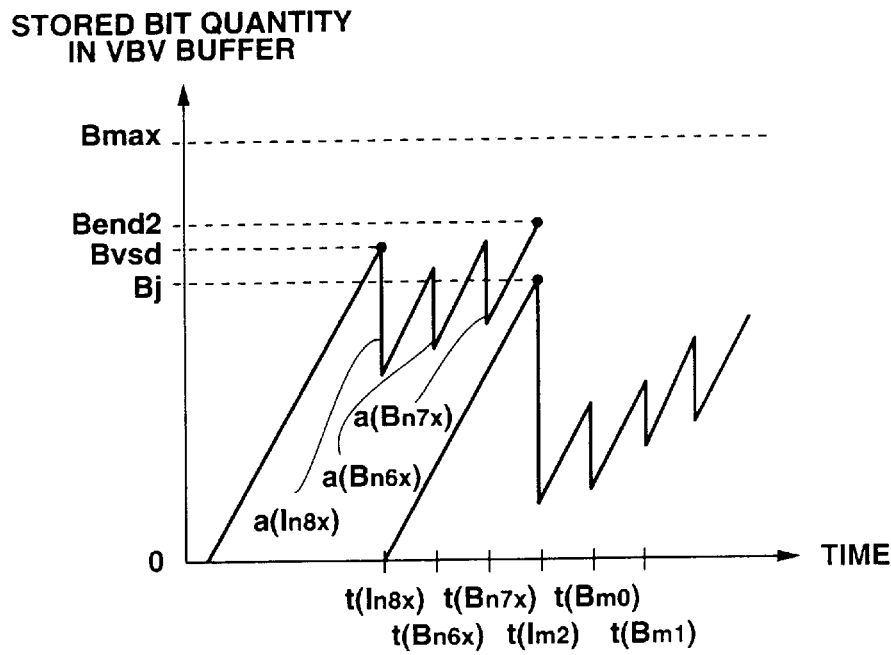
FIG. 30 explains an example that the bit storage quantity Bend2 is judged by the video encoder to be larger than the initial bit storage quantity Bj.

An example of a judgment made by the video encoder 13 at step S43, that the bit storage quantity Bend2 is larger than the initial bit storage quantity Bj, is shown in FIG. 30.

As shown in FIG. 30, if allocated bit amounts are determined by the video encoder 13 at step S41 for the pictures $I_{n8x}$, $B_{n6x}$ and $B_{n7x}$ in the video stream to re-encode, the data amounts indicated with $a(I_{n8x})$, $a(B_{n6x})$ and $a(B_{n7x})$, respectively, are deleted from the buffer when the pictures $I_{n8x}$, $B_{n6x}$ and $B_{n7x}$ are decoded, and the video encoder 13 judges that the bit storage quantity Bend2 is larger than the initial bit storage quantity Bj. The video encoder 13 goes to step S25 where GOP(a-x) shown in FIG. 24b will be re-encoded.

At step S25, the video encoder 13 re-encodes the inpoint-side video stream shown in FIG. 24b, the multiplexer 14 re-multiplexes the video stream re-encoded at step S26 according to the limitation of the video buffer 22, and the operations are ended with the operations at steps S27 and S28 so that the video buffer 22 will not overflow when the multiplexed data is reproduced.

Figure 31:
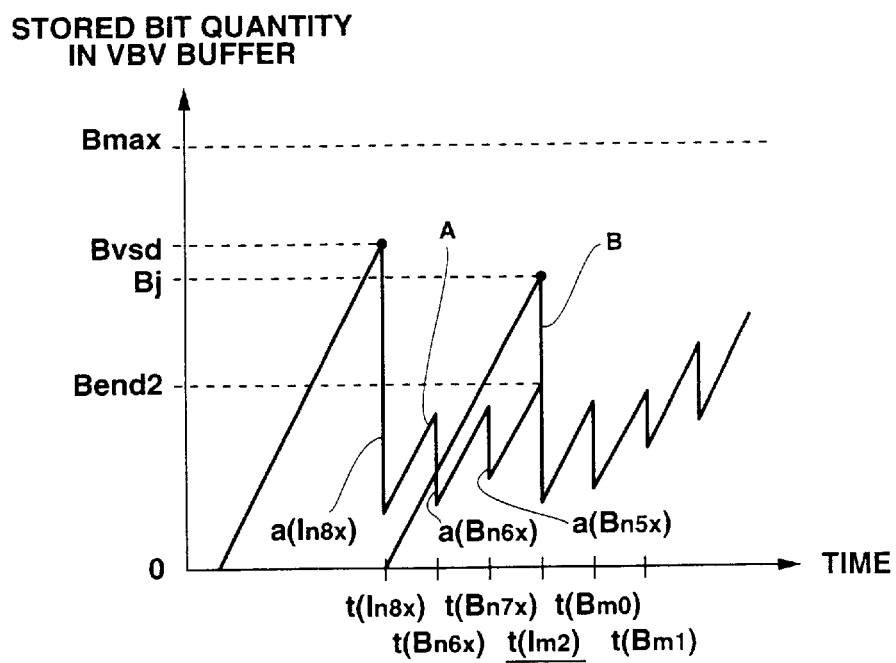
FIG. 31 explains an example that the bit storage quantity Bend2 is judged by the video encoder to be smaller than the initial bit storage quantity Bj.

An example of a judgment made by the video encoder 13 at step S43, that the bit storage quantity Bend2 is smaller than the initial bit storage quantity Bj, is shown in FIG. 31.

As shown in FIG. 31, if allocated bit amounts are determined at step S41 by the video encoder 13 for the pictures $I_{n8x}$, $B_{n6x}$ and $B_{n7x}$ in the video stream to re-encode, the data amounts indicated with $a(I_{n8x})$, $a(B_{n6x})$ and $a(B_{n7x})$, respectively, are deleted from the buffer when the pictures $I_{n8x}$, $B_{n6x}$ and $B_{n7x}$ are decoded, and the video buffer 13 judges that the bit storage quantity Bend2 is smaller than the initial bit storage quantity Bj.

Also as shown in FIG. 31, the video encoder 13 cannot successively re-encode GOP(n-z) to re-encode and GOP(in) not to re-encode so that the bit storage quantity depicts a continuous trajectory. That is, a trajectory A depicted by the bit storage quantity of GOP(n-x) decoded after supplied to the VBV buffer 31 does not coincide with a trajectory B depicted by the bit storage quantity of GOP(m) decoded after supplied to the VBV buffer 31.

At step S44, the video encoder 13 changes the picture type so as to re-encode GOP(n) and GOP(m) as one GOP(b-x) and then returns to step S21. More specifically, the video encoder 13 changes the picture $I_{m2}$ shown in FIG. 24b to a picture $P_{m2x}$ to change the number of pictures and changes the number of pictures to re-encode, thereby generating new GOP(b-x) to re-encode as shown in FIG. 24c. At step S44, the video encoder 13 makes operations at steps S21 to S42 on video data newly generated at step S44, and then makes operations at steps S25 and subsequent steps. With the operation at step S44, the video encoder 13 will change the bit storage quantity of the video buffer 22 shown in FIG. 31 as shown in FIG. 32.

Figure 32:
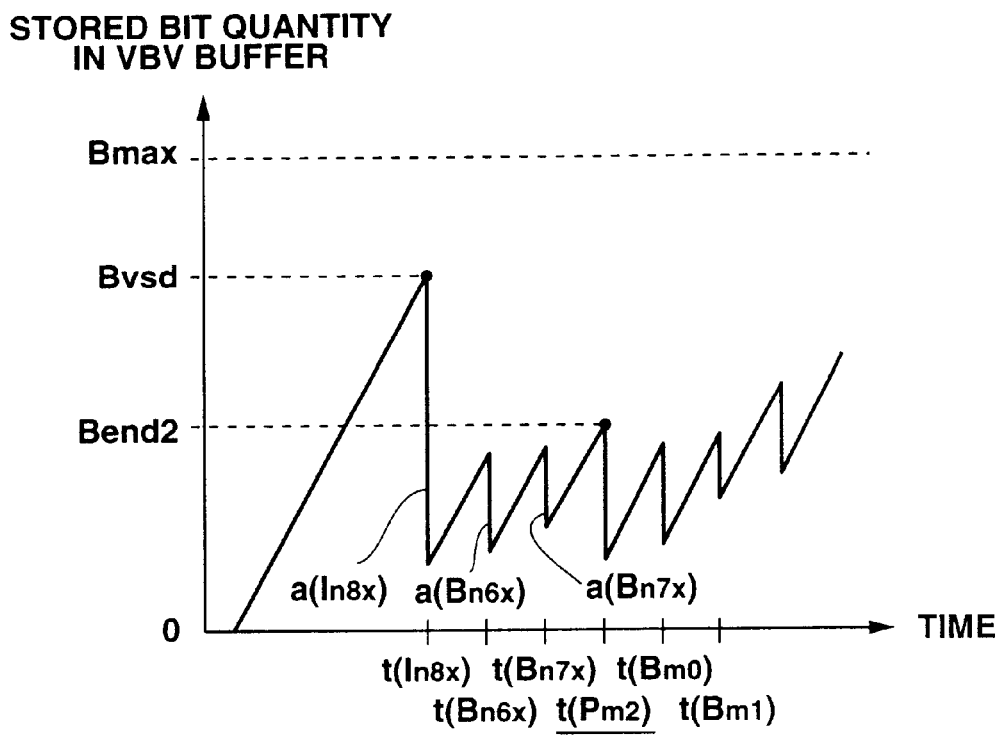
FIG. 32 explains how to change the bit storage quantity of the video buffer shown in FIG. 31.

As will be seen from FIG. 32, in the moving picture recording and/or reproducing apparatus 1, when the allocated bit amounts for the pictures $I_{n8x}$, $B_{n6x}$ and $B_{n7x}$ in the video stream to re-encoded at step S41 are determined by changing the picture $I_{m2}$ in FIG. 24b to a picture $P_{m2x}$ shown in FIG. 24c, data amounts $a(I_{n8x})$, $a(B_{n6x})$ and $a(B_{n7x})$ take place when the pictures $I_{n8x}$, $B_{n6}$x and $B_{n7x}$ are decoded. Thus, it is judged that the bit storage quantity Bend2 is larger than the initial bit storage quantity Bj. The video encoder 13 will go to step S25 to decode GOP(a-x) shown in FIG. 24c. At step S25, the re-encoding and re-multiplexing can be done.

Also as seen from FIG. 32, the video encoder 13 can re-encode GOP(n-x) to re-encode and GOP(m) not to re-encode successively so that the bit storage quantity will depict a continuous trajectory. That is, when pictures $B_{n7}$x and $P_{m2}$ are successively decoded, the bit storage quantity depicts a continuous trajectory.

As having been described in the foregoing, in the moving picture recording and/or reproducing apparatus 1, when it is determined at step S33 that the bit storage quantity Bend1 is smaller than the initial bit storage quantity Bvsd, the picture $I_{10}$x to re-encode is changed at step S34 to a picture $P_{10}$x belonging to a preceding GOP(0) as shown in FIG. 23b to generate a new GOP(a-x) to re-encode as shown in FIG. 23c. Thus it is possible to inhibit the bit storage quantity of the video buffer 22 from abruptly decreasing, as shown in FIGS. 27 and 28. Therefore, in the moving picture recording and/or reproducing apparatus 1, it is possible to re-encode an outpoint-side video data to a higher image quality and re-multiplex the data with a high image quality.

Also in the moving picture recording and/or reproducing apparatus 1, when it is determined at step S43 that the bit storage quantity Bend2 is smaller than the initial bit storage quantity Bj, the picture $I_{m2}$ to re-encode at step S44 s shown in FIG. 24b for example is changed to a picture $P_{m2x}$ to generate a new GOP(b-x) to re-encode as shown in FIG. 24c. Thus, when the inpoint-side video data is re-encoded, the bit storage quantity of the video buffer 22 can depict a continuous trajectory as shown in FIGS. 31 and 32. Therefore, with the moving picture recording and/or reproducing apparatus 1, it is possible to re-encode the outpoint-side video data with higher image quality and re-multiplex it with a high image quality.

In the foregoing, the moving picture recording and/or reproducing apparatus 1 has been described concerning an example of program stream to which SCRs are appended in succession as defined in the MPEG-2 standard. However, the present invention is not limited to such a program stream but it is applicable to a transport stream for multiplexing multiple programs. In case of a transport stream, the moving picture recording and/or reproducing apparatus 1 refers to a program check reference (PCR), not to SCR and uses T-STD for STD, for calculation of the bit storage quantity of the video buffer 22.

Multiplexed streams in the form of transport stream include PCR packet storing a program clock reference (PCR) indicative of a timing of output to the system target decoder 40, packetized elementary stream (PES) of video data to which DTS indicative of decoding timing and PTS indicative of output timing for decoded data are appended as additional information, and consisting of transport packets, PES packet of audio data to which PTS is appended as additional information, and consisting of transport packets, and transport packets intended for transmission of system data. Namely, the multiplexed stream includes a plurality of time-division multiplexed programs. The multiplexed stream has additional information appended thereto for control of the decoding timing and output timing.

Figure 33:
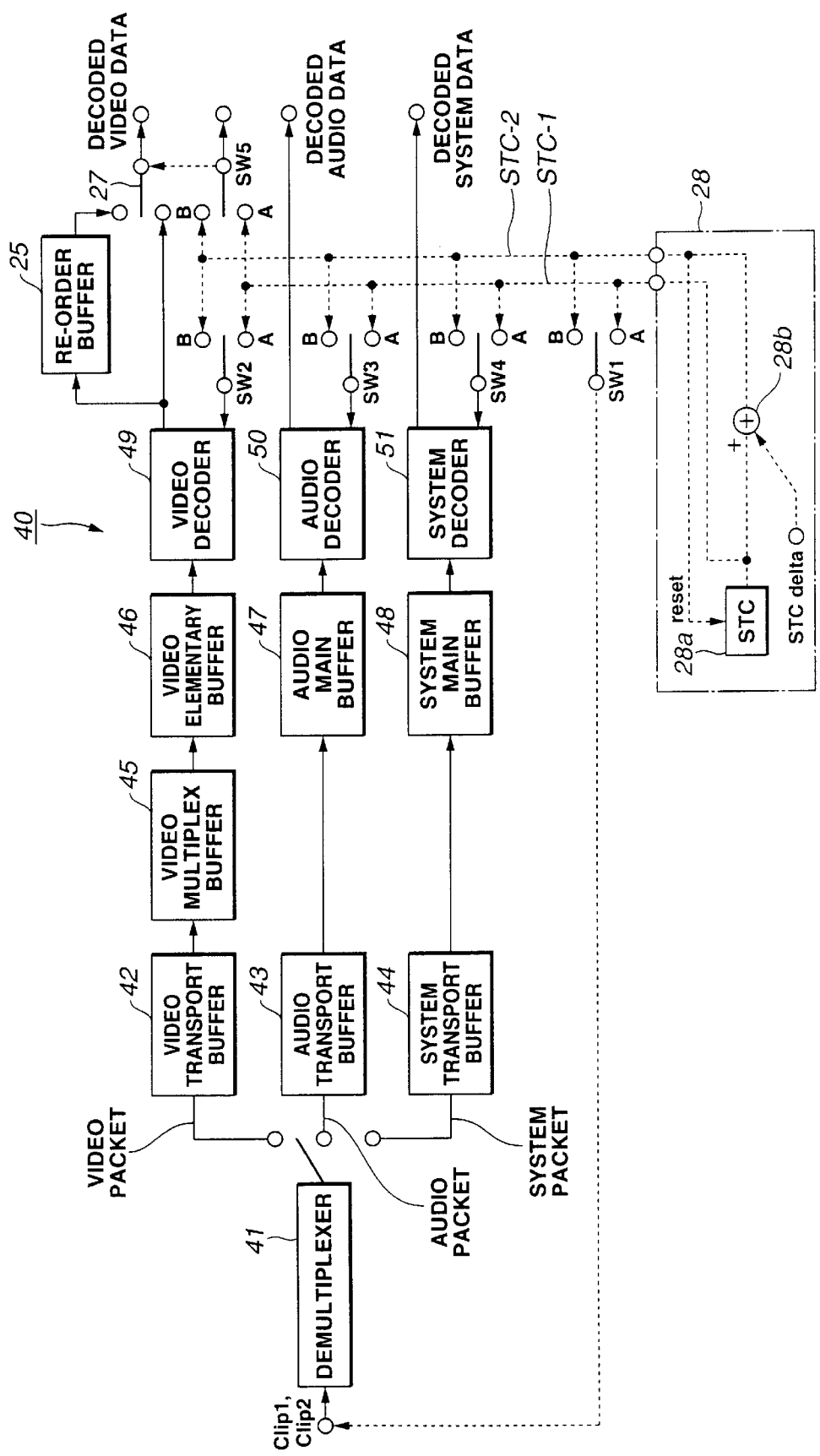
FIG. 33 is a block diagram of a system target decoder to combine multiplexed streams multiplexed in the form of a transport stream by the moving picture recording and/or reproducing apparatus.

FIG. 33 is a block diagram of a system target decoder 40 to decode re-multiplexed streams multiplexed in the form of a transport stream by the moving picture recording and/or reproducing apparatus 1. In FIG. 33, the same components and elements as in the system target decoder 20 are indicated with the same or similar references as in the system target decoder 20, and will not be described in detail.

As seen, the system target decoder 40 is similar to the system target decoder 20 in FIG. 6 provided that it is supplied with a multiplexed stream consisting of multiplexed transport streams.

The system target decoder 40 includes a demultiplexer 41. Supplied with the multiplexed stream, the demultiplexer 41 reads a packet identifier (PID) included in a packet header of each of multiplexed transport streams, and judges, based on the value of the PID of which type the data stored in a payload is, video, audio or system data. Depending upon the result of the judgment based on the PID, the demultiplexer 41 provides a video transport packet, audio transport packet or system transport packet to a video transport buffer 42, audio transport buffer 43 and system transport buffer 44. At this time, the demultiplexer 41 will shift the connection between a connector 41a thereof and terminals connected to the buffers 42 to 44 depending upon the PID value.

The video transport buffer 42 sends only a payload portion (PES packet) of the video transport packet to a multiplexing buffer 45, and sends it as an elementary stream to a video elementary buffer 46.

Audio transport packet and system transport packet are sent directly to an audio main buffer 47 and system main buffer 48 as audio elementary stream and system elementary stream from the audio transport buffer 43 and system transport buffer 44, respectively.

The elementary streams stored in the video elementary buffer 46, audio main buffer 47 and system main buffer 48 are removed from the respective buffers 46 to 48 at a DTS-defined time, and supplied to decoders 49 to 51 where they will be decoded.

At shift from the outpoint-side program to the inpoint-side program in data reproduction by concatenating outpoint and inpoint vide streams to each other, the timing controller 28 generates two STCs, namely, STC-1 synchronous with PCR of the outpoint-side program and STC-2 synchronous with the inpoint-side program.

Re-encoding of the transport stream is effected by the video elementary buffer 46 in such a manner that the video elementary buffer 46 will not to overflow and underflow as in the re-encoding of the program stream.

The re-multiplexing of the transport stream is effected form each buffer of the T-STD to meet the following requirements (1) to (3) prescribed in the MPEG-2 standard:
1. The transport buffers 42 to 44 in which various packets are stored should be blank at least once a second without no overflowing.
2. The video multiplexing buffer 45 should be blank at least once a second with no overflowing.
3. The video elementary buffer 46 and the main buffers 47 and 48 for other streams should not overflow and underflow.

The system target decoder 40 should meet the above-mentioned requirements (1) to (3) when re-multiplexing the data except when the PCR value is discontinued by the edit point. In the system target decoder 40, shifting of the time base from STC-1 to STC-2 before and after the edit point is effected as in the processing of the program stream.

Different from the system target decoder 20 for the program stream, the system target decoder 40 for the transport stream cannot decode video and audio elementary streams before system data and PCR sent by a program association table (PAT) and program map table (PMT) are acquired. Therefore, if PIDs before and after the edit point include one different one, the top of re-multiplexed Clip-2 should include PAT, PMT and PCR in this order.

PCR is discontinued by the edit point. A discontinuity information table (DIT) may be inserted at the edit point to inform the system target decoder of such a discontinuity.

In the foregoing, the moving picture recording and/or reproducing apparatus 1 has been explained concerning an example that for edition to concatenate Clip-1 including designated outpoint pictures and Clip-2 including designated inpoint pictures, vide streams are re-encoded and re-multiplexed. However, the present invention is not limited to this example, but it can be applied to an edition for insertion of a new video stream into a multiplexed stream, for example. At this time, in the moving picture recording and/or reproducing apparatus 1, to prevent the video buffer 22 from overflowing and underflowing, a bit storage quantity is calculated of the video buffer 22 for re-encoding and re-multiplexing of multiplexed streams before and after a new video stream inserted in the existing video stream.

What is claimed is:

1. An encoder comprising:

means for re-encoding a first encoded stream ending with a first picture and a second stream concatenated to the end of the first picture and starting with a second picture;

a first means for calculating, for a video buffer in a virtual system target decoder model for decoding encoded streams re-encoded by the encoding means, a first bit storage quantity which should be when input of the first picture of the first encoded stream to the video buffer ends;

a second means for calculating, based on the first bit storage quantity calculated by the first bit storage quantity calculating means, a second bit storage quantity the video buffer in the virtual system target decoder model should have for starting decoding of the second picture of the second encoded stream according to the virtual system target model;

means for controlling, based on the second bit storage quantity calculated by the second bit storage quantity calculating means, re-encoding of the second encoded stream, effected by the encoding means; and a multiplexing means for generating, based on the first bit storage quantity, a multiplexed stream including the second encoded stream re-encoded by the encoding controlling means.

2. An encoder comprising:

means for re-encoding a first encoded stream ending with a first picture and a second stream concatenated to the end of the first picture and starting with a second picture;

a first means for calculating, for a video buffer in a virtual system target decoder model for decoding encoded streams re-encoded by the encoding means, a first bit storage quantity which should be when input of the first picture of the first encoded stream to the video buffer ends;

a second means for calculating, based on the first bit storage quantity calculated by the first bit storage quantity calculating means, a second bit storage quantity the video buffer in the virtual system target decoder model should have for starting decoding of the second picture of the second encoded stream according to the virtual system target model;

means for controlling, based on the second bit storage quantity calculated by the second bit storage quantity calculating means, re-encoding of the second encoded stream, effected by the encoding means; and means for changing a number of pictures included in the second encoded stream based on the second bit storage quantity;

the encoding means re-encoding the second encoded stream based on an instruction supplied from the number-of-pictures changing means.

3. An encoding method comprising steps of:

calculating, for a video buffer in a virtual system target decoder model for decoding re-encoded encoded streams, a first bit storage quantity which should be when input of a first picture of a first encoded stream ending with the first picture to the video buffer ends;

calculating, based on the first bit storage quantity, a second bit storage quantity the video buffer in the virtual system target decoder should have for starting, according to the virtual system target model, decoding of a second picture of a second encoded stream concatenated to the end of the first picture and beginning with the second picture;

re-encoding the second encoded stream based on the second bit storage quantity; and generating, based on the first bit storage quantity, a multiplexed stream including the re-encoded second encoded stream.

4. An encoding method comprising steps of:

calculating, for a video buffer in a virtual system target decoder model for decoding re-encoded encoded streams, a first bit storage quantity which should be when input of a first picture of a first encoded stream ending with the first picture to the video buffer ends;

calculating, based on the first bit storage quantity, a second bit storage quantity the video buffer in the virtual system target decoder should have for starting, according to the virtual system target model, decoding of a second picture of a second encoded stream concatenated to the end of the first picture and beginning with the second picture;

re-encoding the second encoded stream based on the second bit storage quantity; and changing a number of pictures included in the second encoded stream based on the second bit storage quantity to re-encode the second encoded stream whose number of pictures is changed.

5. An encoder comprising:

means for re-encoding a first encoded stream beginning with a first picture and a second stream concatenated to the beginning of the first picture and ending with a second picture;

means for calculating a first bit storage quantity a video buffer in a virtual system target decoder model for decoding encoded streams re-encoded by the encoding means should have for decoding the first picture of the first encoded stream;

means for calculating, based on the first bit storage quantity calculated by the first bit storage quantity calculating means, a second bit storage quantity the video buffer in the virtual system target decoder model should have for ending decoding of the second picture of the second encoded stream according to the virtual system target model;

means for controlling, based on the second bit storage quantity calculated by the second bit storage quantity calculating means, re-encoding of the second encoded stream, effected by the encoding means; and means for changing a number of pictures included in the second encoded stream based on the second bit storage quantity;

the encoding means re-encoding the second encoded stream based on an instruction supplied from the number-of-pictures changing means.

6. An encoding method comprising steps of:

calculating a first bit storage quantity a video buffer in a virtual system target decoder model for decoding re-encoded encoded streams should have for decoding a first picture at the top of a first encoded stream;

calculating, based on the first bit storage quantity, a second bit storage quantity the video buffer should have for ending, according to the virtual system target model, decoding of a second picture of a second encoded stream concatenated to the beginning of the first picture and ending with the second picture;

re-encoding the second encoded stream based on the second bit storage quantity; and changing a number of pictures included in the second encoded stream based on the second bit storage quantity to re-encode the second encoded stream whose number of pictures is changed.

* * * * *